(12) United States Patent
Lawry et al.

(10) Patent No.: US 9,054,826 B2
(45) Date of Patent: Jun. 9, 2015

(54) ADAPTIVE SYSTEM FOR EFFICIENT TRANSMISSION OF POWER AND DATA THROUGH ACOUSTIC MEDIA

(75) Inventors: Tristan J. Lawry, East Lyme, CT (US); Gary J. Saulnier, East Greenbush, NY (US); Kyle R. Wilt, Sand Lake, NY (US); Jonathan D. Ashdown, Greenwich, NY (US); Henry A. Scarton, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 92 days.

(21) Appl. No.: 14/007,871

(22) PCT Filed: Mar. 28, 2012

(86) PCT No.: PCT/US2012/030902
§ 371 (c)(1),
(2), (4) Date: Sep. 26, 2013

(87) PCT Pub. No.: WO2012/141891
PCT Pub. Date: Oct. 18, 2012

(65) Prior Publication Data
US 2014/0016558 A1 Jan. 16, 2014

Related U.S. Application Data

(60) Provisional application No. 61/517,037, filed on Apr. 12, 2011.

(51) Int. Cl.
*H04J 11/00* (2006.01)
*H04L 27/26* (2006.01)
(Continued)

(52) U.S. Cl.
CPC ............ *H04J 11/00* (2013.01); *H04L 27/2698* (2013.01); *H04B 11/00* (2013.01); *H04L 5/0046* (2013.01); *H04L 27/2657* (2013.01); *H04L 27/2697* (2013.01)

(58) Field of Classification Search
None
See application file for complete search history.

(56) References Cited

U.S. PATENT DOCUMENTS

| 4,213,199 A | 7/1980 | Labaw et al. |
| 4,932,006 A | 6/1990 | Delignieres |

(Continued)

FOREIGN PATENT DOCUMENTS

| WO | WO 2005/093976 | 10/2005 |
| WO | WO 2008/105947 | 9/2008 |

OTHER PUBLICATIONS

Ottman, Geffrey K., "Adaptive Piezoelectric Energy Harvesting Circuit for Wireless Remote Power Supply", IEEE Transactions of Power Electronics, vol. 17, No. 5, Sep. 2002.

(Continued)

*Primary Examiner* — Bunjob Jaroenchonwanit
(74) *Attorney, Agent, or Firm* — Notaro, Michalos & Zaccaria P.C.

(57) ABSTRACT

An apparatus and method for transmitting data and power through a metal barrier using ultrasonic waves, having ultrasonic transmission channels through the barrier formed by coupling ultrasonic transducers on opposite sides of the barrier. A power transmitter sends power over a channel and forward and reverse data transmitters send forward and reverse data signals by orthogonal frequency-division multiplexing OFDM over a separate channel. The data signals are made up of plural sub-carriers at plural different sub-carrier frequencies with none of the sub-carriers of the forward transmission signal being at a power harmonic frequency.

23 Claims, 11 Drawing Sheets

(51) Int. Cl.
*H04B 11/00* (2006.01)
*H04L 5/00* (2006.01)

(56) References Cited

U.S. PATENT DOCUMENTS

| | | | |
|---|---|---|---|
| 5,159,580 A | | 10/1992 | Andersen et al. |
| 5,437,058 A | | 7/1995 | Grosz et al. |
| 5,594,705 A | | 1/1997 | Connor et al. |
| 5,982,297 A | | 11/1999 | Welle |
| 6,037,704 A | | 3/2000 | Welle |
| 6,127,942 A | * | 10/2000 | Welle ............... 340/870.16 |
| 6,625,084 B1 | | 9/2003 | Payton |
| 6,639,872 B1 | | 10/2003 | Rein |
| 6,798,716 B1 | * | 9/2004 | Charych ............... 367/119 |
| 6,823,810 B2 | | 11/2004 | Carlson et al. |
| 7,400,262 B2 | | 7/2008 | Chemali et al. |
| 7,514,844 B2 | | 4/2009 | Unkrich |
| 7,525,398 B2 | | 4/2009 | Nishimura et al. |
| 7,586,392 B2 | | 9/2009 | Unkrich |
| 7,654,148 B2 | | 2/2010 | Tomlinson, Jr. et al. |
| 7,760,585 B1 | | 7/2010 | Ortiz et al. |
| 7,894,306 B2 | | 2/2011 | Bagshaw et al. |
| 7,902,943 B2 | | 3/2011 | Sherrit et al. |
| 2005/0171429 A1 | * | 8/2005 | Mathew et al. ............... 600/437 |
| 2009/0003133 A1 | | 1/2009 | Dalton et al. |
| 2010/0027379 A1 | | 2/2010 | Saulnier et al. |
| 2010/0280379 A1 | * | 11/2010 | Satoh ............... 600/447 |
| 2011/0237951 A1 | * | 9/2011 | Bandy et al. ............... 600/459 |
| 2012/0001875 A1 | * | 1/2012 | Li et al. ............... 345/177 |
| 2012/0171963 A1 | * | 7/2012 | Tsfaty ............... 455/41.3 |

OTHER PUBLICATIONS

Primerano, Richard A., "High Bit-rate Digital Communications through Metal Channels", Drexel University, Jul. 2010.

* cited by examiner

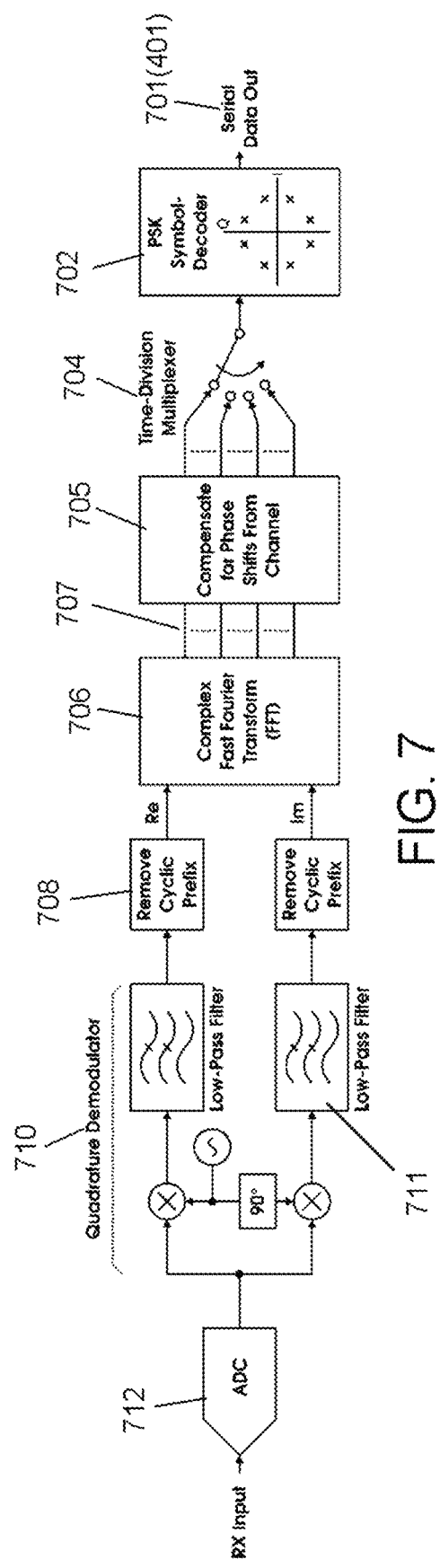
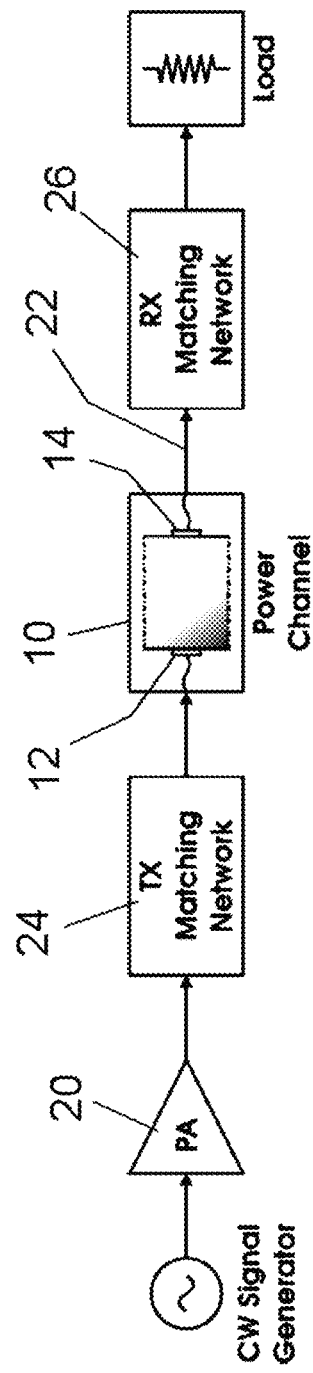
FIG. 7
FIG. 8

ADAPTIVE SYSTEM FOR EFFICIENT TRANSMISSION OF POWER AND DATA THROUGH ACOUSTIC MEDIA

CROSS-REFERENCE TO RELATED APPLICATION

This application claims priority on U.S. Provisional Patent Application No. 61/517,037 filed Apr. 12, 2011 which is incorporated herein by reference.

FIELD AND BACKGROUND OF THE INVENTION

The present invention relates generally to the field of communication and power transmission, and in particular to wireless communication and power transmission through a barrier using ultrasonic waves.

Published patent application US2010/0027379, published Feb. 4, 2010 and incorporated herein by reference, discloses an ULTRASONIC THROUGH-WALL COMMUNICATION (UTWC) SYSTEM for communicating digital information through a barrier in the form of a thick metal wall, using ultrasonic techniques so that no through-holes are needed in the barrier. Using this system, signals can be transmitted through the barrier. For example, sensor signals that monitor conditions on one side of the barrier, can be transmitted to the other side of the barrier. The barrier may be the wall of a pressure vessel and the conditions to be monitored may be those of a hostile, high temperature and high pressure, gaseous or liquid environment in the pressure vessel.

U.S. Pat. No. 7,902,943 to Sherrit et al. discloses a WIRELESS ACOUSTIC-ELECTRIC FEED-THROUGH FOR POWER AND SIGNAL TRANSMISSION including a first piezoelectric transducer to generate acoustic energy in response to electrical energy from a source and a second piezoelectric transducer to convert the received acoustic energy to electrical energy used by a load.

U.S. Pat. No. 7,894,306 to Martin et al. for an APPARATUS AND METHOD FOR DATA TRANSFER THROUGH A SUBSTRATE discloses transferring data through a submarine hull or other solid boundary using high frequency acoustic signals to avoid penetration of the hull or boundary.

U.S. Pat. No. 5,594,705 to Connor et al. for an ACOUSTIC TRANSFORMER WITH NON-PIEZOELECTRIC CORE uses a transformer for transmitting energy across a medium, including primary and secondary transducers on opposite sides of a medium and a generator coupled to the primary transducer for applying a driving signal thereto.

U.S. Pat. No. 5,982,297 to Welle discloses an ultrasonic data communication system includes first and second transducers coupled together through a coupling medium for communicating input and output undulating pressure waves between the transducers for the transfer of input and output data between an external controller and an embedded sensory and actuating unit. An internal processor powers the second embedded transducer to generate ultrasonic waves into the medium that are modulated to send the data from the embedded sensor so that considerable energy is needed for the embedded circuits.

Also see U.S. Pat. Nos. 6,625,084; 6,639,872; 7,514,844; 7,525,398 and 7,586,392 for other approaches to the transmission of data or power through a barrier using ultrasound.

A more comprehensive approach to wireless data and power transmission through a barrier is taught by R. Primerano in "High Bit-rate Digital Communication through Metal Channels," PhD dissertation, Drexel University, July 2010, hereafter referred to as Primerano. Without conceding that Primerano is prior art to the invention disclosed in the present application, Primerano is interesting because both he and the invention of the present application use Orthogonal Frequency-Division Multiplexing or OFDM modulation with a cyclic prefix to send data at a high rate through a metal wall using ultrasound. The use of OFDM compensates for signal loss due to echos caused by boundaries or due to other incongruities across the channel. Primerano does not, however, teach a system that simultaneously delivers power in one direction while data is transmitted in one or both directions, nor the elimination of certain, data-carrying, OFDM sub-carrier frequencies, which become contaminated by the power signal's harmonic signature.

A significant issue with simultaneously sending power and data is that the power delivery signal must be large to enable the delivery of a significant amount of power while the communication signals should be small to minimize the amount of power required for communications. As a result it can be difficult to avoid having the power delivery signal interfere with the communication signals. Using separate frequency ranges for the power signal and the communication signals can help minimize interference but the fact that the system is not strictly linear, i.e. the power amplifier, transducers and/or metal wall channel will create harmonics of the power signal, results in the generation of harmonics of the power delivery signal that can interfere with the communication signals.

As will be explained in the following, the invention disclosed here synchronizes the power delivery and communication signals such that the harmonics of the power delivery signal occur precisely at frequencies that coincide with individual channel frequencies of the OFDM signal. This results in a far more effective transmission of data and power through a barrier, than has been possible in the past.

SUMMARY OF THE INVENTION

It is an object of the present invention to provide an apparatus and method for the effective transmission of data and power through a barrier that may contain acoustic interfaces at boundaries of differing acoustic materials or conditions along the barrier, or which have acoustic properties that may vary with time or temperature or pressure, and that, in turn tend to degrade the data and/or power transmission. Differences in the densities and/or elastic moduli of the various materials comprising the channel can cause those elements to have differing acoustic properties, specifically their acoustic impedances may differ, resulting in a very frequency-selective transmission channels which can decrease its data and/or power transmission capabilities.

According to the present invention, high rate data and high power transmission are maintained by using Orthogonal Frequency-Division Multiplexing (OFDM) modulation with a cyclic prefix to send data at a high rate through the barrier channel and, because there are many parallel channels in the OFDM signal, by not using those channels that are at the harmonic frequencies of the power delivery signal. This maintains reliable data transmission without significant loss in the data rate.

The specifics of the required relationships between the power delivery signal frequency and the OFDM signal parameters are described later in this application.

The present invention thus uses bit loading. Bit loading is a technique for efficient data transmission, which involves selecting a modulation format for each sub-carrier in an OFDM signal according to its signal quality, e.g. the signal-to-noise ratio (SNR), of that particular sub-carrier. Power loading takes this process one step farther by also adjusting the power level of each individual channel in the OFDM signal. Power loading in addition to bit loading makes it possible to further increase the data rate of the communications link.

The present invention also provides a system for establishing data communication in both directions. If bit and/or power loading is used, it is necessary to send information, often called "side information," from a receiver back to a transmitter that will instruct the transmitter how to adjust the modulation format (bit loading) and power (power loading) for each OFDM sub-carrier based on its received signal quality. In the following several methods for setting up this feedback channel are disclosed. When the communication of data is in the opposite direction of the power delivery, the power delivery signal itself can be modulated by the side information. This method avoids the need for a separate communications channel.

Although the data rate for this method might be low, the fact that the properties of the metallic wall channel will generally change slowly, meaning that the bit and/or power loading will not need to be adjusted rapidly, makes it a viable approach. Another approach is to share the communication channel in time in a half-duplex way, i.e. send data using the same channel in the opposite direction part of the time. This approach can implement high data rate links in both directions, though the data rate in each direction would be lower than that if the channel is used for one direction only. A third approach is to share the communication channel in frequency, i.e. use a subset of the OFDM channels for each direction. A fourth approach is to implement a separate communication channel for each direction. This approach requires an additional set of transducers but gives the highest rates in each direction.

Accordingly, another object of the invention is to provide an apparatus and method for transmitting data and power through a barrier using ultrasonic waves. Ultrasonic channels are formed through the barrier by coupling ultrasonic transducers to opposite sides of the barrier. A power transmitter sends power by a continuous-wave (CW) signal over a channel and forward and reverse data transmitters send forward and reverse data signals by orthogonal frequency division multiplexing (OFDM) over a channel. The data signals are made up of plural sub-carriers at plural different sub-carrier frequencies with none of the sub-carriers of the forward transmission signal being at a power harmonic frequency for the power transmission to avoid interference and maximize power transmission.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a diagram of an OFDM receiver with FFT Implementation according to the invention;

FIG. 8 is a diagram of power transmission link hardware (AC Power Output) of the invention;

DESCRIPTION OF THE PREFERRED EMBODIMENTS

Figure 1:
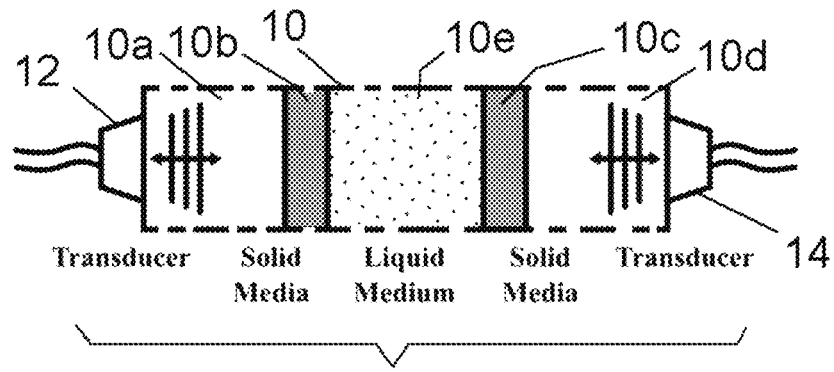
FIG. 1 is a schematic illustration of a multi-layer acoustic-electric barrier with strong multipath signal propagation of an acoustic channel through the barrier.

Referring now to the drawings, in which like reference numerals are used to refer to the same or similar elements, FIG. 1 shows an example of an acoustic-electric channel through a barrier 10 for transmitting signals through solid or other media, with an electroacoustic transducer 12 and 14 on each side of the barrier 10. Throughout this disclosure, the transducers 12 and 14 shown in the drawings symbolize the transducers proper plus their connection to the barrier wall, i.e. electrodes with or without epoxy, acoustical couplant, electrical insulation layer, acoustical transition layers, etc. Such an arrangement can be especially advantageous when the media is electrically conducting, appreciably thick and when maintaining its structural integrity is critical, e.g. by not drilling holes through the barrier. This is because Faraday shielding effects prevent conventional electromagnetic wireless signals from passing through conducting barriers and penetrating certain barriers would compromise their strength. In such cases an acoustic-electric channel provides a non-destructive, wireless alternative solution.

In most practical acoustic-electric transmission channels, abrupt acoustic interfaces are present at boundaries of various acoustic materials in the barrier. The materials may have different acoustic properties, specifically the density of and speed of sound in these materials and hence their acoustic impedances, may differ. FIG. 1 illustrates one example of a complex multi-layer acoustic-electric channel with four different solid layers 10a, 10b, 10c and 10d, and one liquid layer 10e. Each interface causes a fraction of any incident sound waves to be reflected back toward their source and allows the remainder to pass through. Ultimately these many reflections lead to reverberation in the channel where the energy of an acoustic signal induced by the first transducer will be split up and will traverse many different paths before it reaches the second transducer or returns to the first transducer as a series of echoes, spread out over time.

This phenomenon is also known as multipath propagation since the result is multiple copies of the acoustic signal reaching the other side of the channel with different time delays. The time duration of a channel's reverberation is known as its delay spread and the inverse of the delay spread is called the channel's coherence bandwidth. A channel's coherence bandwidth signifies the largest bandwidth over which a signal passed through the channel will experience approximately flat (i.e. non-frequency selective) fading and where it is not necessary to use channel equalization to mitigate the fading effects. The lengthy reverberation in most acoustic-electric channels results in small coherence bandwidths, resulting in narrowband non-frequency selective channels which limit the achievable data rates of signals sent through the channel unless either the multipath echoes can be removed from the received signal through costly equalization, or a communication scheme is used that is tolerant of multipath distortion.

Figure 2:
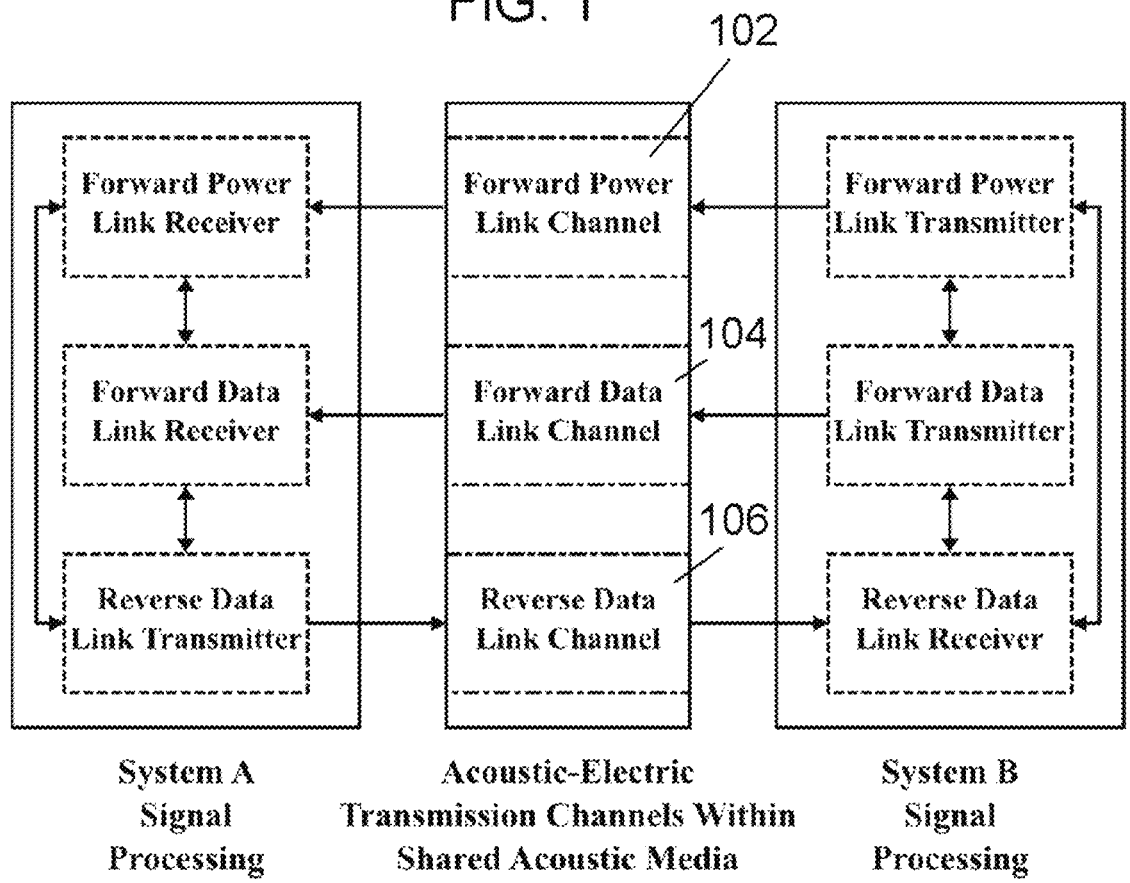
FIG. 2 is a high-level diagram of a system configuration of the invention for sending data and power through a barrier, including the type of multipath barrier shown in FIG. 1.

With reference to FIG. 2, the invention utilizes three transmission links to achieve simultaneous transmission of power (over link 102) and bi-directional transmission of data (over links 104 and 106). These include a forward power transmission link 102, a forward data transmission link 104, and a reverse data transmission link 106. These various links are all implemented using acoustic-electric channels built upon a shared acoustic medium or media, as illustrated in FIG. 2. In some cases, three independent channels are not needed for the three transmission links, as they can be configured to share the same acoustic-electric channel. Both analog and digital signal processing elements are used to control and manipulate the power and data signals, to prevent interference between the power and data links, to relay information between the various links, as well as to interface between the various links at both sets of electrical channel interfaces.

Many ultrasonic data transmission systems are known in the prior art, however they suffer from frequency-selective acoustic-electric channels with relatively small coherence bandwidths. Previous systems have relied on modulating a single communication carrier (a sinusoidal signal of one particular frequency) to transmit data through these reverberant channels. The small coherence bandwidth of these channels, however, has limited the achievable carrier modulation rates of these systems. By utilizing transducers that operate at higher frequencies, by more precisely aligning the carrier frequency with the transducer resonant frequency, and by implementing narrowband mechanical impedance matching layers, some groups have managed to achieve reasonably high data rates, but these are brute force improvement approaches that use fundamentally the same single-carrier communication scheme and they result in a poor utilization of the channel's available bandwidth (which is typically much larger than its coherence bandwidth) giving them poor spectral efficiencies. Spectral efficiency is a common communication system characteristic and it describes how densely information is packed into a channel's available bandwidth. The units of spectral efficiency are bits per second per hertz.

The system of the present invention uses a more advanced and more advantageous communication scheme, namely a version of discrete multi-tone modulation called orthogonal frequency-division multiplexing or OFDM, that allows for much higher communication rates to be achieved without the typical coherence bandwidth limitations of reverberant acoustic-electric channels. The advantage of OFDM is to split the very frequency-selective channel into a number of narrowband channels, each with an effective bandwidth that is much smaller than the system's coherence bandwidth, and to use a very large number of sub-carriers, each of which is modulated with different amounts of data at very low rates so that the effects of the channel's multipath distortion can easily be mitigated. Although each individual sub-carrier may transmit a small amount of information at a low rate, the aggregate achievable data rate can be very large given that there are so many of them. As a result, this divide and conquer communication approach allows acoustic-electric communication systems to achieve very high spectral efficiencies. In addition, the system presented is able to adapt to the type and quality of acoustic-electric channel that is formed, regardless of how many different layers exist or the reverberance of the channel.

It is also capable of tracking channel variations over time. This is especially important if the mechanical system composing the channel is subjected to any time-dependent stresses, strains, temperature fluctuations, etc., as the channel's coherence bandwidth may also be time-dependent as a result. This adaptation is accomplished in the reverse data link, for example, by performing infrequent intermittent calibration routines to collect information about the channel's frequency response at the reverse data link's receiver, relaying this information back to the reverse data link's transmitter 106 via the forward data link 104, and dynamically adapting the amount of information (number of bits) and transmit power that is allocated to each sub-carrier in the reverse data link's OFDM configuration. This allows the overall data throughput of the reverse data link 106 to remain high with great reliability, even as the channel's characteristics change. The same process can be performed for the forward link using the reverse link to send information from the forward link's receiver to its transmitter 104.

Unlike known systems, the system of the invention is also capable of simultaneously transmitting power through one or more separate acoustic-electric channels formed on the same mechanical substrate as the communication channel(s) while having a negligible impact on the performance of the communication link (104, 106), even when high-power signals are transmitted in close proximity to the communication channel(s). Electrical characterization and power matching methods are used to guarantee maximal power transfer efficiency through the power transmission channel(s). In addition each power transmission link 102 tracks its channel's optimal power transfer frequency over time, allowing the system to adapt to time-dependent mechanical channel variations and maintain high efficiencies. This is accomplished by monitoring the amount of power harvested in the forward power link's receiver over time, relaying that information back to the power link's transmitter via the system's reverse data link 106, and dynamically adjusting the forward power link's operating frequency to ensure maximal power transfer efficiency.

The techniques outlined here can be applied to channels comprised of many different acoustic materials, configurations and geometries, as well as many different electroacoustic transducers.

In the following, specific embodiments of the system, which have been tested and verified in a laboratory environment, are disclosed. These configurations utilize pairs of piezoelectric disk transducers that are coaxially aligned and loaded onto opposite sides of a solid medium barrier using an acoustic couplant, in order to form acoustic-electric transmission channels for both power and data transmission through the solid barrier.

Figure 3:
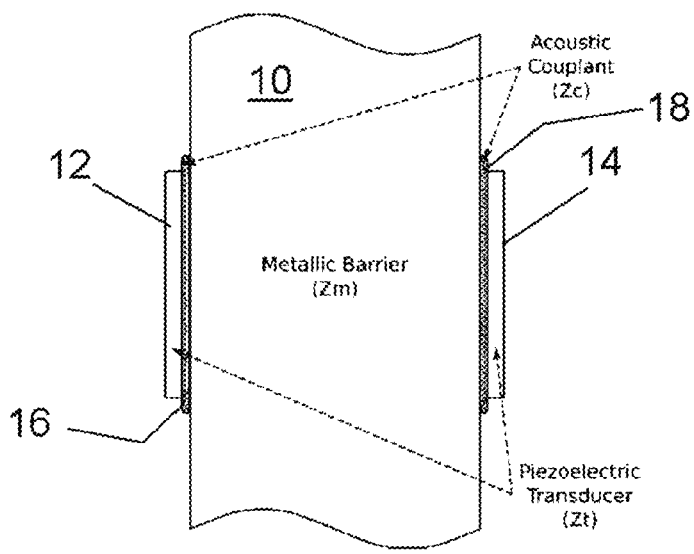
FIG. 3 is a schematic illustration of a pair of piezoelectric transducers mounted on opposite sides of a metallic barrier, understanding that multiple pairs of piezoelectric, ultrasonic transducers are mounted for simultaneous power and data transmission according to the present invention.

An example of a system utilizing a channel formed by loading piezoelectric ultrasonic transducers 12 and 14 on a solid acoustic medium or barrier 10 is shown in FIG. 3. This system allows for wireless bi-directional transmission of information and for simultaneous wireless uni-directional transmission of large amounts of electrical power through solid metallic barriers, using ultrasound. For both power delivery and data communication, acoustic-electric transmission channels are formed by coaxially aligning pairs of piezoelectric transducers 12, 14 (configured to induce longitudinal vibrations) on opposite sides of a metallic barrier 10 and loading them onto the barrier's walls using an acoustic couplant or epoxy 16, 18 as shown in FIG. 3. The direction of power transmission is defined as the forward direction. This forward power transmission and high-rate data transmission in the opposite (reverse) direction are accomplished by using independent ultrasonic transducer pairs for each link or channel 102, 104 and 106. The power channel may be formed using one or more transducer pairs depending on the power requirements of the interfacing system. Forward data transmission, in the same direction as the power transmission, can also be implemented using one of four methods. This information can be modulated on the power signal at a low rate in the power transmission channel. Alternatively, this information can be transmitted at a high data rate using the same transducer pair as that used for the reverse data transmission channel by either time-sharing the transducer pair (i.e. using a half-duplex communication scheme), or using separate frequency bands (i.e. using a frequency-division duplexing communication scheme). Finally, a separate transducer pair can be used to implement an independent forward transmission channel through which both low and high-rate data communication are possible.

FIG. 3 shows a single pair of piezoelectric transducers mounted on the opposite sides of the metallic barrier but multiple pairs are similarly mounted for simultaneous power and data transmission.

Acoustic-electric Transmission Channel

Figure 4:
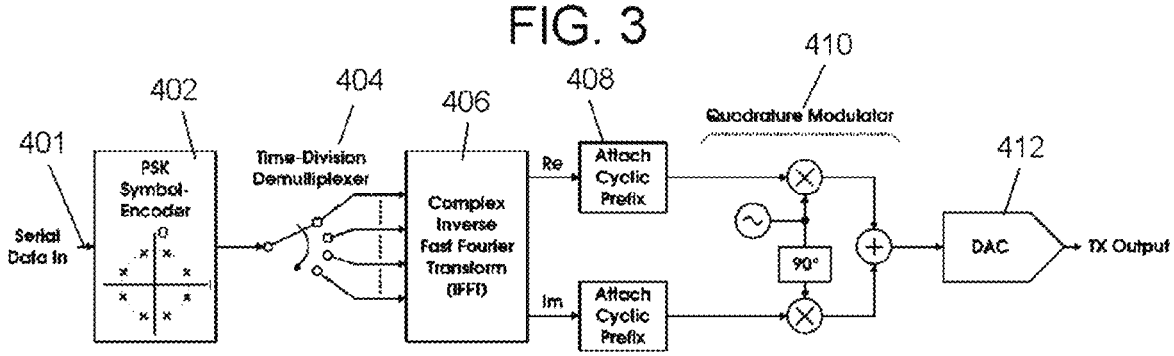
FIG. 4 is a diagram of a forward OFDM transmitter with IFFT implementation according to the invention.

FIG. 4 illustrates an acoustic-electric transmitter of the invention in greater detail. The reverberation of acoustic signals within the metallic barrier 10 makes the channel highly frequency-selective. As an acoustic signal encounters abrupt impedance changes at material interfaces, a portion of the signal is reflected producing the reverberation. When the transmission channel is formed using a pair of transducers 12, 14 mounted as in FIG. 3, this reverberation causes signals at some frequencies to add constructively, resulting in high transmittances, and signals at other frequencies to add destructively, resulting in low transmittances. When delivering power with a continuous wave signal, it is desirable to select an operating frequency that presents the highest transmittance (power transfer efficiency) to minimize electrical and mechanical losses due to component heating, signal reflection, and beam divergence as the signal passes through the acoustic media.

When transmitting data through the acoustic-electric channel it is important to recognize that its acoustic reverberations cause multipath propagation of signals, spreading out signal energy over time in the form of echoes. As a channel's thickness increases, as the number of its acoustic layers increases, and as impedance mismatches at both its electrical and acoustic interfaces get worse, multipath reverberation lasts longer and becomes more problematic to data transmission. This lengthy delay spread results in a small coherence bandwidth, yielding a very narrowband non-frequency-selective channel which limits the achievable data rates of signals sent through it unless either the multipath echoes can be removed from the received signal through equalization, or a communication scheme is used that is tolerant of multipath distortion.

Power Delivery Link

The power delivery link 102 uses a power transmitter and receiver forming a channel shown schematically in FIG. 8, which comprises one or more transducer pairs 12, 14. If a single transducer pair is used, the channel can be driven by a single amplifier 20. If multiple transducer pairs are used, they can be either driven in unison by a single amplifier, or driven individually by separate amplifiers. In typical high-power applications power amplifiers (PAs) 20 are used as the channel-driving amplifiers. The power signal received at 22 on the opposite side of the metallic barrier 10 can be converted to a useful power source using rectifier or power converter (AC-AC or AC-DC converter) electronics. In order to maximize the power transfer efficiency of the system, the channel is characterized with a network analyzer and electrical impedance matching networks 24 and 26 are added between the channel's ports and any interfacing electronics to simultaneously conjugate match the system, thereby minimizing reflective losses due to electrical mismatches. Additional fine-tuning of the power delivery efficiency as well as the tracking of time-varying changes in transmission properties is accomplished by relaying information regarding the power being delivered to the power link's receiver back to the power link's transmitter via the reverse data link. This feedback path of side information allows the power link transmitter to adjust the frequency used for power delivery in order to ensure the system maintains maximal power delivery over time. As will be explained in greater detail later, this "side information" provides information about the acoustic properties of the channel. When starting up, this information is used to adjust the OFDM carriers to optimize transmission. After start-up, the information, which may represent the changes in acoustic properties or just the acoustic properties themselves, are used to maintain the optimality of the transmission.

Multiple transducer pairs and/or multiple driving amplifiers may be used in the power delivery system, and the outputs from each power channel's rectifier or power converter may be combined to create a single more-powerful power supply, or may be maintained as separate independent supplies.

Reverse Data Link

In many applications the reverse data link or channel 106, i.e. the data link from the side receiving the power transfer to the side where power is applied, is the most important. An example is the application in which power is delivered through the barrier to a sensor which returns data back through the barrier. A high-rate communication link can be implemented in the frequency-selective channel using orthogonal frequency-division multiplexing (OFDM). The OFDM communication scheme utilizes many evenly spaced orthogonal sub-carriers, and divides data between these numerous signals. The main motivation for using an OFDM-based approach is to partition the wideband frequency-selective fading channel into a large independent set of narrowband sub-channels that exhibit only flat, i.e. not frequency-selective, fading. This greatly reduces the impact of channel reverberations on the performance of the communication system. Although each sub-carrier may only be able to sustain a relatively low data rate in this scheme, a high aggregate data rate can still be attained by utilizing a large number of these sub-carriers. Also, to obtain approximately flat fading in each of the sub-channels, the sub-carriers must be spaced such that each modulated bandwidth is less than the coherence bandwidth of the full acoustic-electric channel. If this is not the case, the sub-channels will be frequency-selective as well, and the benefits of employing an OFDM scheme will be greatly diminished.

With OFDM, each sub-carrier is modulated with a conventional digital modulation scheme, such as phase shift keying (PSK) or quadrature amplitude modulation (QAM). OFDM signals can be created in a computationally-efficient way using an inverse fast Fourier transform (IFFT) to produce the collection of modulated sub-carriers, and detected using a fast Fourier transform (FFT) to recover the data on each sub-carrier. Diagrams showing an example of an OFDM transmitter and receiver with IFFT and FFT implementations that utilize PSK modulation are given in FIG. 4 and FIG. 7, respectively.

The OFDM transmitter pictured in FIG. 4 accepts a stream of high-rate digital data at 401 and encodes sequences of bits into PSK symbols in PSK Symbol Encoder 402, which are essentially complex numbers that represent the magnitude and phase of a sinusoidal signal. This symbol stream is then divided amongst a large number of sub-carriers using a time-division demultiplexer 404, resulting in multiple data streams operating at much lower rates than the initial input data stream 401. Since different sub-carriers may use different modulation levels, e.g. some may encode 1 bit per PSK symbol, others 2 bits per PSK symbol, etc., these bit rates may vary from one subcarrier to another in the OFDM signal. An N-point IFFT (Inverse Fast Fourier Transform) 406 is then used to convert the array of complex frequency domain numbers from demultiplexer 404, which represent the magnitude and phase of the various sub-carriers, to a complex time-domain representation of these signals which we call the OFDM word with real part (Re) and imaginary part (Im) at baseband. Next, a cyclic prefix with duration equal to or greater than the delay spread (multipath echoing) of the channel is appended to the beginning of the IFFT output at 408 in order to reduce the inter-symbol interference (ISI) experienced between successive OFDM words.

Figure 5:
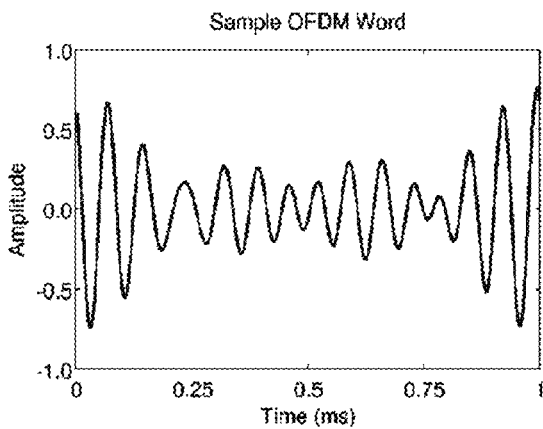
FIG. 5 is a graph showing an example of an OFDM word.
Figure 6:
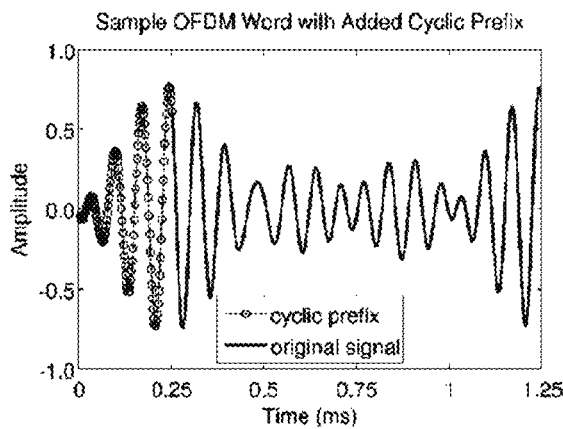
FIG. 6 is a graph like FIG. 5 but showing an example of a cyclic prefix addition to the OFDM word.

As illustrated in FIGS. 5 and 6, the cyclic prefix is a copy of the last portion of the I FFT output (e.g. about the last 0.25 ms in the graph of FIG. 5), which is inserted before the IFFT output as shown in FIG. 6, to ensure a cyclic continuity between the cyclic prefix end and the beginning of the I FFT output. An example of the addition of a cyclic prefix to an OFDM word is illustrated in FIGS. 5 and 6.

The lengthened complex baseband OFDM word is then translated to a higher frequency range using a quadrature modulator 410 in FIG. 4, where it becomes a purely real signal. Finally this discrete-time OFDM signal is passed to a digital-to-analog converter (DAC) 412 where it is converted to a continuous-time signal TX Output that can interface with analog signal processing hardware and ultimately the acoustic-electric channel via the transducer 12 on one side of the barrier 10. Note that forward error-correction coding (FEC) can be used with the system. This coding can be inserted in a number of places, including the incoming bit stream 401 or in the N streams present at the output of the time-division demultiplexer 404.

The OFDM receiver pictured in FIG. 7 takes the continuous-time analog OFDM signal RX Input at the receiver's side of the acoustic-electric channel, that is from the transducer 14 on the other side of the barrier 10, and samples it with an analog-to-digital converter 712 to create a discrete-time representation of the signal. This sampled signal is then passed through a quadrature demodulator 710 which shifts the signal down to baseband (around DC, or 0 Hz) and filters out image bands with a low-pass filter 711. The OFDM signals cyclic prefix, which should be corrupted by the channel's multipath distortion, is then removed from the baseband signal at 708, leaving an undistorted copy of the OFDM word's real (Re) and imaginary (Im) parts. The set of complex time-domain samples representing the OFDM word are then passed through an FFT block 706 which produces a set of complex numbers at 707 representing the received magnitude and phase of each OFDM sub-carrier. The data transmission channel introduces a phase shift and gain on every sub-carrier in the OFDM signal at 705. The complex FFT output is passed through a block to compensate for these phase shifts and gains with complex rotations and gains. The complex FFT output is passed through a block to compensate for these phase shifts with complex rotations. This block can be configured using a calibration routine that sounds the channel sequentially with each sub-carrier at a known magnitude and phase, records the magnitude and phase of the received signal, and calculates a complex value that represents the magnitude and phase of the channel's transfer function at each sub-carrier frequency. The compensated sub-carrier data is then passed through a time-division multiplexer 704 to look at each sub-carrier in a linear order. Finally, each of the sub-carriers' PSK symbols are decoded in decoder 702 to reproduce the original digital bit stream 701 (401) that was passed to the OFDM transmitter. Note that FEC coding blocks can also be implemented in the OFDM receiver, complementary to the transmitter of FIG. 4.

The performance of the OFDM data link is optimized by using a combination of both bit and power loading. Bit loading is the adjustment of the number of bits encoded onto individual sub-carriers (their symbol constellation size) and power loading is the adjustment of the transmit power allocated to each subcarrier. Generally, bit and power loading are performed to optimize the performance of the link in some way, e.g. to minimize error rate or to maximize the data rate. To perform these loadings, it is necessary to send the "side information" from the OFDM receiver of FIG. 7 back to the OFDM transmitter of FIG. 4 to relay information about the channel's response which can be used by the transmitter to determine the best bit and power loading settings for each sub-carrier. Alternately, the side information may consist of commands that instruct the transmitter to adjust the bit and power loading in a particular way. In most applications environmental conditions and stresses, and subsequently the acoustic-electric channel's response, change very slowly, so the data rate required for the side information is relatively low.

Forward Data Link (Side Information Communications)

Figure 9:
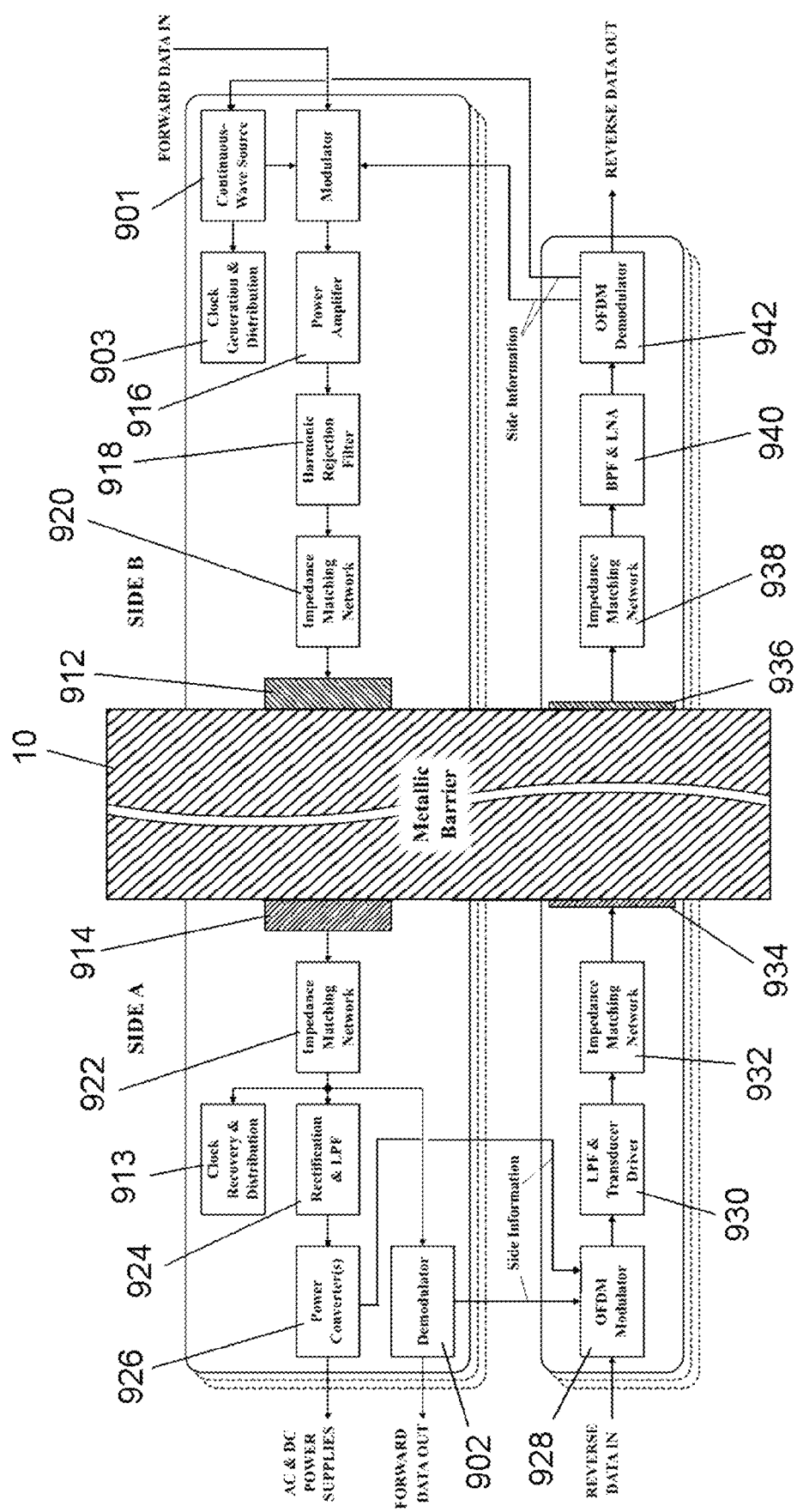
FIG. 9 is a diagram of a simultaneous power and data system with combined forward data link modulating and power delivery signals according to one embodiment of the invention.

There are four approaches for implementing the communications link to send side information to the OFDM modulator for the reverse link. This communications link sends data in the forward direction, i.e. the same direction as the power transmission. One low-rate approach is to slowly modulate the power delivery signal itself which would now act as a communications carrier signal as well as a power delivery signal as shown in FIG. 9. A demodulator 902 on the receive side, Side A, can demodulate this signal to recover the data. Amplitude, phase and/or frequency modulation techniques can be used.

Due to the low data rate of this approach, the bandwidth of the power delivery signal will stay small and should ideally remain below the coherence bandwidth of the power transmission channel. Two potentially high-rate approaches are to share a communication channel between the forward and reverse data links using a half-duplex (FIG. 11) or a frequency-division duplex (FIG. 12) transmission scheme. Here a single channel is either time-shared between the forward and return links, or the two links operate in separate independent frequency bands. If the side information only requires a low data rate, the shared communications channel will be used for the reverse data path most of the time. OFDM can be used for communications in both directions.

Figure 10:
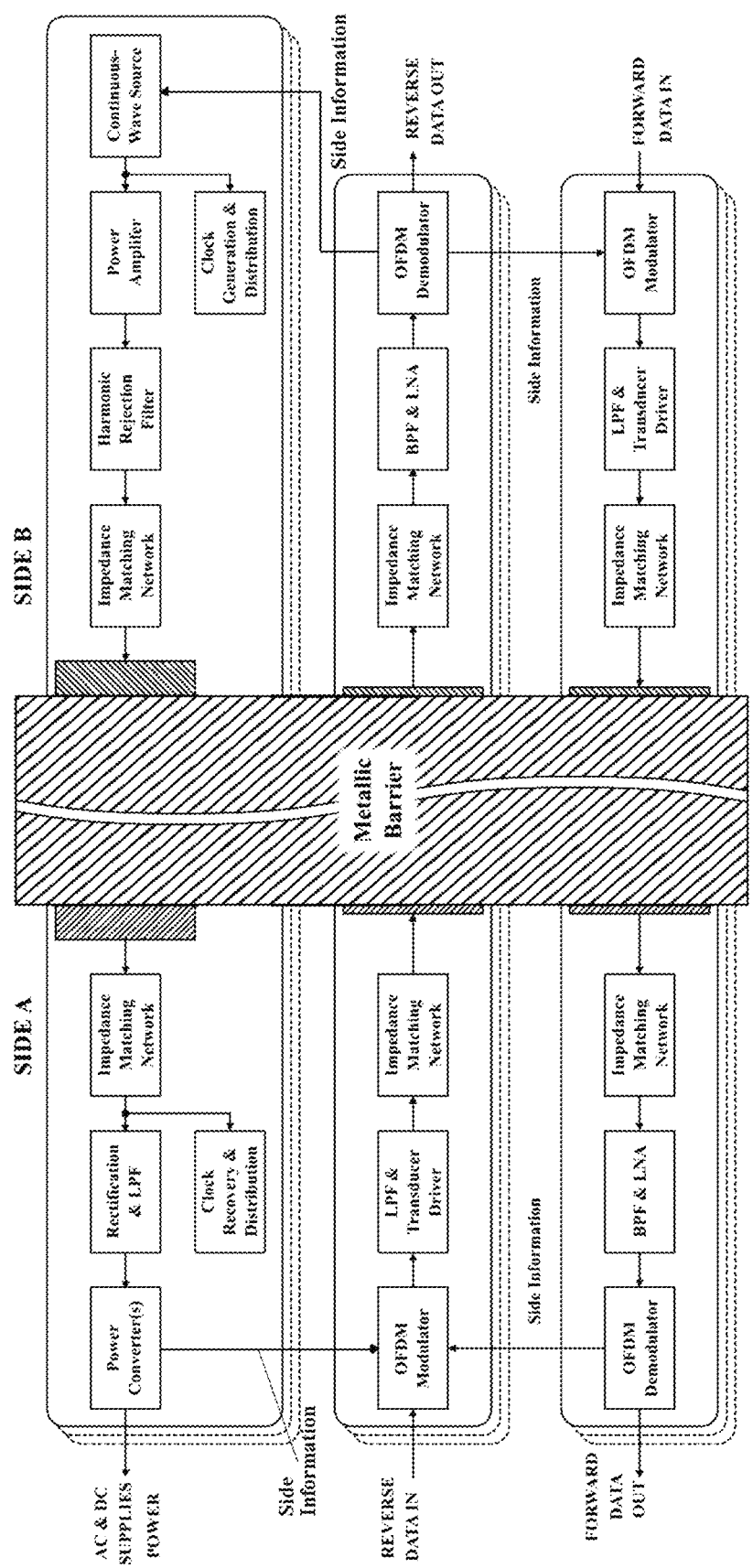
FIG. 10 is a diagram of a simultaneous power and data system with the forward data path utilizing a separate set of transducers according to another embodiment of the invention.

A fourth potentially high-rate approach is to implement one or more independent forward and reverse channels using separate pairs of transducers (FIG. 10). In this approach the hardware used for the forward data link system could essentially be a replica of the hardware in the reverse data link system meaning that OFDM can be used.

In the last two methods, the forward data link may support a data rate that exceeds that required for the side information and the link can be used to send additional data as well.

Synchronization

When configuring the system, e.g. as shown in FIG. 9, to use simultaneous power and data transmission, clock synchronization between the electronic systems on both sides of the metallic barrier 10 can be accomplished by passing a power delivery signal on Side B, typically a continuous-wave signal or tone 901, to a clock recovery circuit (e.g. a phase-locked loop) 903. The recovered clock 913 on Side A can then be manipulated with clock dividers and multipliers to derive clocks for the data transmission electronics and other components on the same side of the metallic barrier. Synchronizing the clocks 903 and 913 on both sides A and B of the metallic barrier 10 is not necessary, but it can simplify the design of the communications receiver and help reduce the interference between the power and communications signals, as discussed below.

In the case where simultaneous power transmission is not desired, one or more of the transmitter's OFDM sub-carrier frequencies, or a frequency outside of the communication bandwidth, can be dedicated to carry a pilot tone which can similarly be used by a clock recovery circuit on the opposite side of the barrier to ensure proper synchronization.

Simultaneous Power and Data

When delivering power and communicating simultaneously, it is desirable to minimize interference between the power delivery and communication signals. One solution is to use a power delivery frequency that is outside the frequency band occupied by the communications signal. However, nonlinearities (no matter how slight) in the operation of the power amplifier 916 in FIG. 9, and piezoelectric transducers 912 and 914, will ultimately generate harmonics that may interfere with the communications signal, particularly if the communications signal occupies a frequency band that is higher than the power delivery frequency. Using a power delivery frequency that is higher than the band used for communications mitigates this problem. However using a higher frequency makes it more difficult to deliver high power levels due to the fact that the power transducers are thinner, making them less durable and not able to handle as much power. Additionally, higher power transmission frequencies can result in an increased power loss in the barrier due to scattering of the acoustic signal by the grain structure of the metal.

With the OFDM communication scheme, the effect of power signal harmonics falling within the OFDM signal bandwidth can be minimized by ensuring that the harmonic power delivery frequencies coincide precisely with OFDM sub-carrier frequencies. When the power harmonic frequency and sub-carrier frequency are exactly the same, the energy associated with the power harmonic is isolated to a single bin when the FFT is performed in the OFDM receiver. By not using the sub-carrier corresponding to that frequency bin, i.e. assigning no bits to the sub-carrier during the bit loading operation, the OFDM communication link can avoid interference due to the power delivery frequency harmonic at the cost of a small (often negligible) reduction in data throughput, especially in a system with a large number of sub-carriers.

To make the power delivery harmonics land in single FFT bins, it is necessary to implement the appropriate relationship between the power delivery frequency ($f_{power}$), the OFDM subcarrier frequency spacing ($f_{subcarrier\ spacing}$), and one of the many OFDM sub-carrier frequencies ($f_{subcarrier}$), (1) $f_{power} = N^* f_{subcarrier\ spacing}$, where N a positive integer; and (2) $f_{subcarrier} = M^* f_{power}$, where M a positive integer.

One method to implement this clocking scheme is to recover the continuous-wave power delivery signal and use it as a reference clock to which the OFDM system can be synchronized. The power signal can be passed through integer clock multiplier and divider stages to generate a clock at the OFDM system's sub-carrier spacing frequency. The rest of the OFDM system's rates can be derived directly from the sub-carrier spacing frequency using additional clock multipliers, as described in the previous equations.

An alternative and more complex method to implement the clocking scheme is to pass a pilot tone for synchronization at one of the OFDM sub-carrier frequencies. Using a phase-locked loop (PLL) and clock multipliers and dividers this pilot tone could be locked in frequency and phase to the CW power delivery signal, thereby creating a synchronous clock for the data link and its DSP to utilize.

System Block Diagrams

As mentioned, FIG. 9 is a block diagram of a simultaneous power and data system in which the data for the forward path modulates the power delivery signal. A continuous-wave (sinusoidal) voltage source 901 is at the top right on Side B, the transmission side of the ultrasonic channel of the barrier 10. This source generates the sinusoidal power delivery signal which in this embodiment is also the carrier for the low data rate forward data, i.e. the data that is sent from Side B to Side A that includes the side information needed to control operations such as bit and power loading. Many types of modulation can be used, including amplitude and/or phase modulation techniques. The continuous-wave source also feeds a Clock Generation & Distribution block 903 which generates all the needed clocks for Side B. These clocks are synchronous with the continuous-wave power signal. The modulated continuous-wave signal is amplified using the Power Amplifier 916 and fed to a Harmonic Rejection Filter 918. Filter 918 suppresses harmonics present in the amplified continuous-wave signal that might fall in the band of the data communication signals, when the communication frequency band is located at higher frequencies than the power delivery signal. An Impedance Matching Network 920 improves the impedance match between the filter and the piezoelectric transducer 912 to optimize the conversion of the electrical power to acoustic power. The acoustic signal from the piezoelectric transducer 912 (consisting primarily of longitudinal waves in the metallic barrier) traverses the barrier 10 and reaches the piezoelectric transducer 914 that is on Side B, the receiving side, mounted directly opposite the transmit transducer 912. This transducer converts the acoustic signal into an electrical signal and another Impedance Matching Network 922 acts to improve the impedance match with subsequent circuits. The signal at the output of the Impedance Matching Network 922 is passed to Rectification and Low-pass Filter (LPF) 924, Clock Recovery and Distribution block 913, and Demodulator block 902. The Clock Recovery and Distribution block 913 generates the clock signals needed for Side A in synchrony with the power delivery signal. As noted above, having the clocking for both Sides A and B locked to each other or, equivalently, locked to the same power signal source, is important for minimizing the performance loss caused by power signal interference in the communication signal bandwidth. The output of the Impedance Matching Network 922 also feeds the Rectification and LPF block 924 which rectifies and filters the signal to produce a DC power signal. This DC signal feeds Power Converter(s) 926 for supplying AC and/or DC power at desired voltages to the Side A system. Finally, the Demodulator 902 is used to recover the Forward Data that had modulated the power delivery signal. The side information that is recovered from the data stream is fed to an OFDM Modulator 928 for the reverse link.

The Reverse Data feeds the OFDM Modulator 928 on Side B, which also receives the Channel (Side) Information that was sent from Side A via the power delivery signal and additional side information from the Power Converter(s) 926 which it will convey to Side B. The resulting OFDM signal is sent to an LPF and Transducer Driver 930 which removes out-of-band signal power such as, for instance, the power that is contained in sampling images after digital-to-analog conversion. A driver circuit acts on the LPF output to produce a signal with an appropriate driving impedance for another Impedance Matching Network 932, such that the power transfer to the other piezoelectric transducer 934 on the receiving side A is optimized. The acoustic wave produced by the transducer on Side A passes through the wall 10 and is received at the corresponding transducer 936 on transmission Side B. Once again, an Impedance Matching Network 938 provides the desired impedance match and the resulting signal is sent to a Bandpass Filter (BPF) and Low-Noise Amplifier (LNA) block 940. This block removes out-of-band power and amplifies the desired signal. The amplified signal is sent to the OFDM Demodulator 942 which recovers the transmitted data. The output of the OFDM Demodulator 942 may also contain Channel (Side) Information for the reverse channel that can be fed to the Forward Data Link's Modulator as well as additional side information that can be fed to the Continuous Wave Source 901 for power signal frequency control.

As is illustrated in FIG. 9, the power/forward data and reverse data hardware, each with their own transducer pair, can be replicated multiple times to increase the amount of power delivered and/or the throughput capacities of the data links. With multiple channels, it may be advantageous to use a single Continuous-Wave Source and Clock Generation and Distribution for the complete Side B system in order to coordinate the multiple power and communication channels to minimize interference.

FIG. 10 shows a variation on the system presented in FIG. 9 in which the forward data channel uses its own pair of transducers separate from those used for forward power transmission. In this case, the forward channel is not restricted in data rate and can have the same data rate capacity as the reverse link. As with FIG. 9, the hardware associated with each link can be replicated to increase the overall power, reverse data rate and/or forward data rate capacities of these systems.

Figure 11:
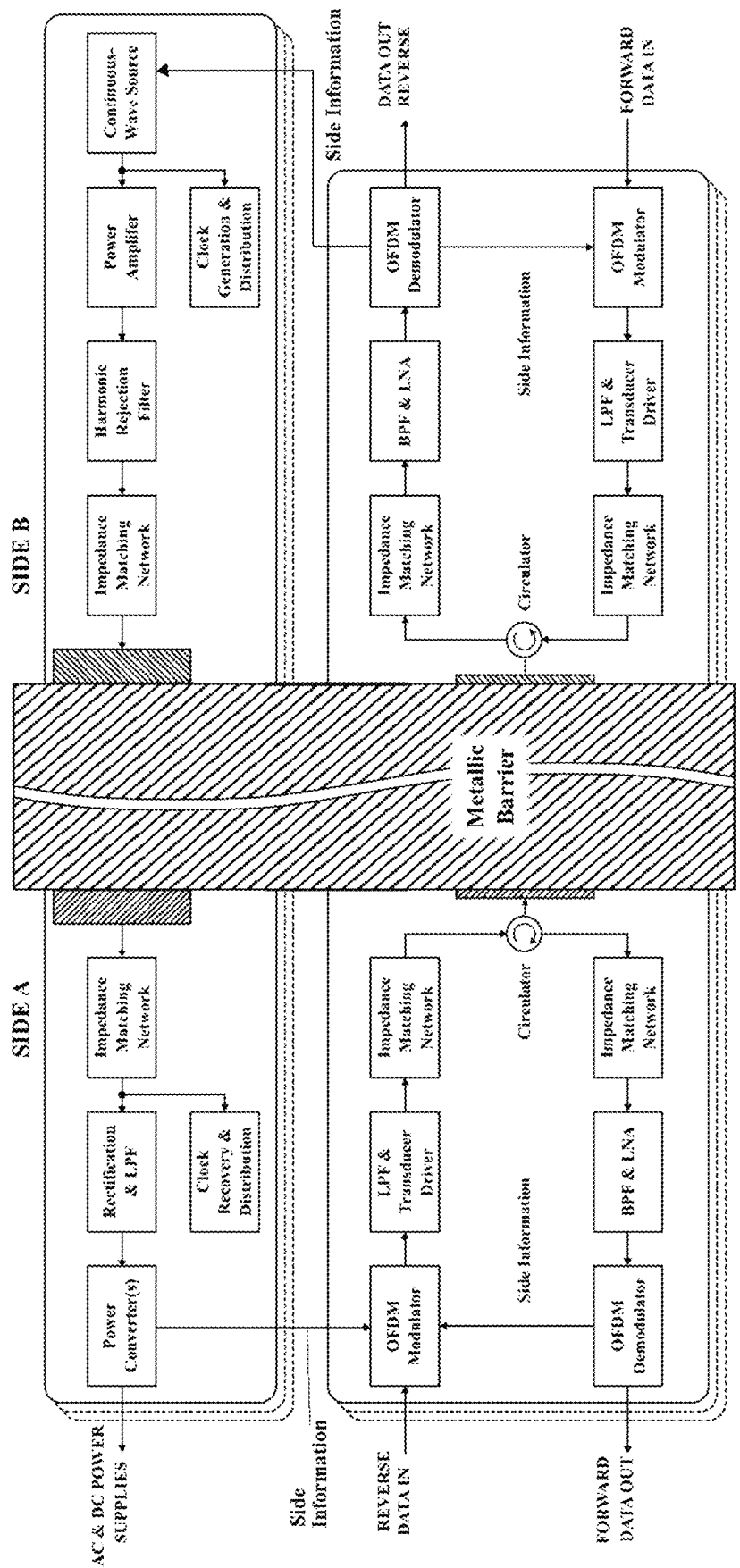
FIG. 11 is a diagram of a simultaneous power and data system with the forward and reverse data paths time-sharing a set of transducers (time-division multiplexing) according to a still further embodiment of the invention.

FIG. 11 shows a variation on the system presented in FIG. 10 in which the forward and reverse data links share the same acoustic-electric channel(s) by staggering their operation in time (half-duplex communications). In this configuration, fewer transducers are necessary, but there is a reduction in the data links' potential throughput capacity since they will be non-operational for a fraction of every time-sharing cycle. A circulator on each side of the barrier enables the sharing of the transducers to the forward and reverse links.

Figure 12:
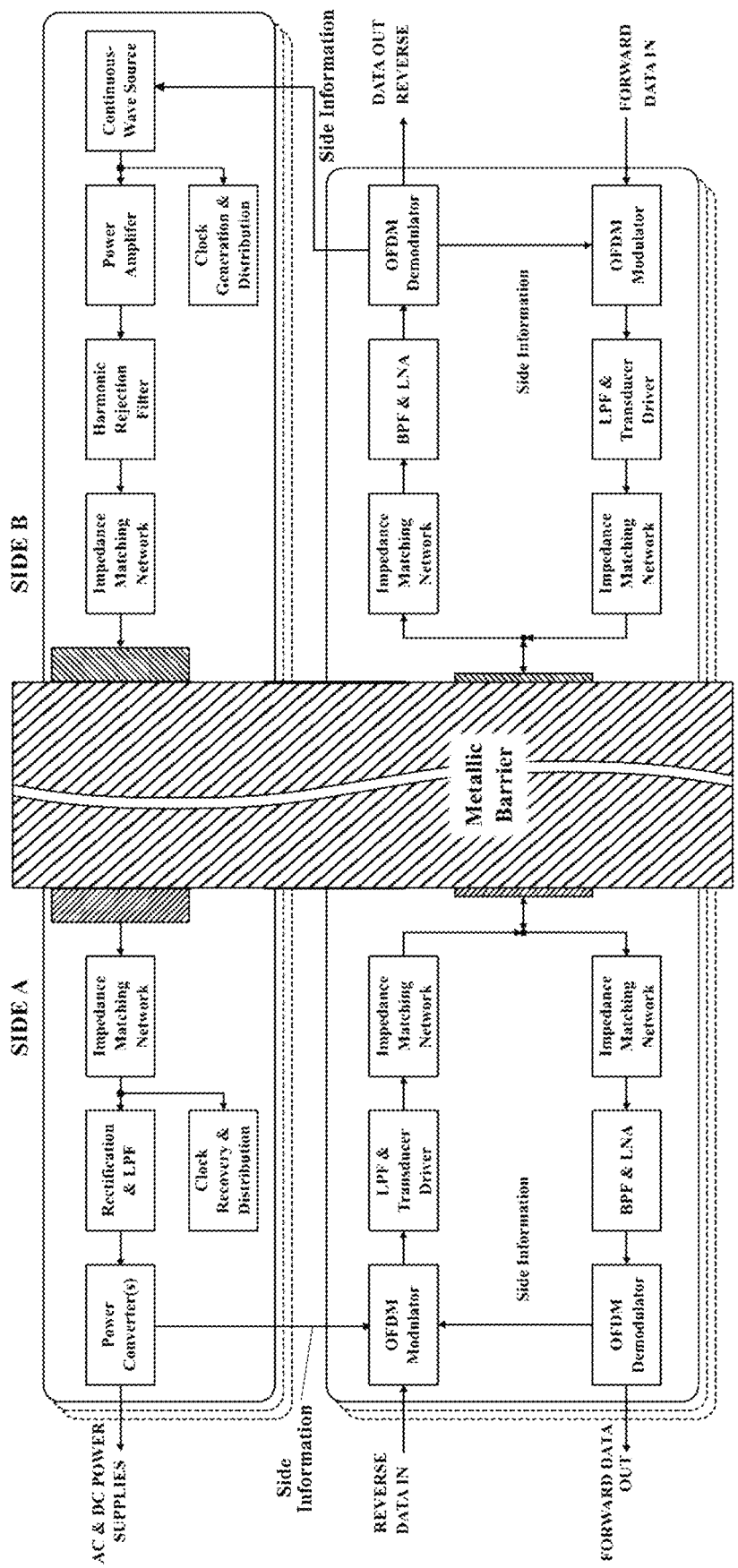
FIG. 12 is a diagram of a simultaneous power and data system with the forward and reverse data paths simultaneously sharing a set of transducers by operating in independent frequency ranges (frequency-division multiplexing) according to another embodiment of the invention.

FIG. 12 shows another variation on the system presented in FIG. 10 in which the forward and reverse data links share the same acoustic-electric channel(s) simultaneously, by operating in independent frequency bands (frequency-division multiplexing). In this configuration, fewer transducers are necessary, but there is yet again a reduction in the data links' potential throughput capacity since the full acoustic-electric channel bandwidth will be partitioned between the forward and reverse paths.

In the event that the forward data link's required throughput is low compared to the reverse data link, the overhead will be very low in the half-duplex and frequency-division multiplexing implementations, making the area and resource savings associated with these configurations very advantageous.

Prototype System Measurements & Performance

A prototype system comprised of an un-modulated forward power transmission link and a separate reverse data transmission link has been developed for simultaneous power and data transmission through a 2.5 in. thick steel block. Piezoelectric transducers were utilized as the electroacoustic energy converting devices in both the power and data channels. The prototype system was configured similarly to the system presented in FIG. 9, with independent power and reverse data links. No forward data link was built into the prototype since the purpose of the prototype was to test the feasibility of the communication and power delivery techniques. A single power channel was used, consisting of a single pair of 2.625 in. diameter transducers with 1 MHz nominal longitudinal resonant frequencies. These transducers were co-axially aligned on opposite sides of the wall, and are acoustically coupled to the wall using a thin layer of epoxy. A single data transmission channel was used for the return data link consisting of a single pair of 1 in. diameter transducers with 4 MHz nominal longitudinal resonant frequencies.

Power Transmission Link

Figure 15:
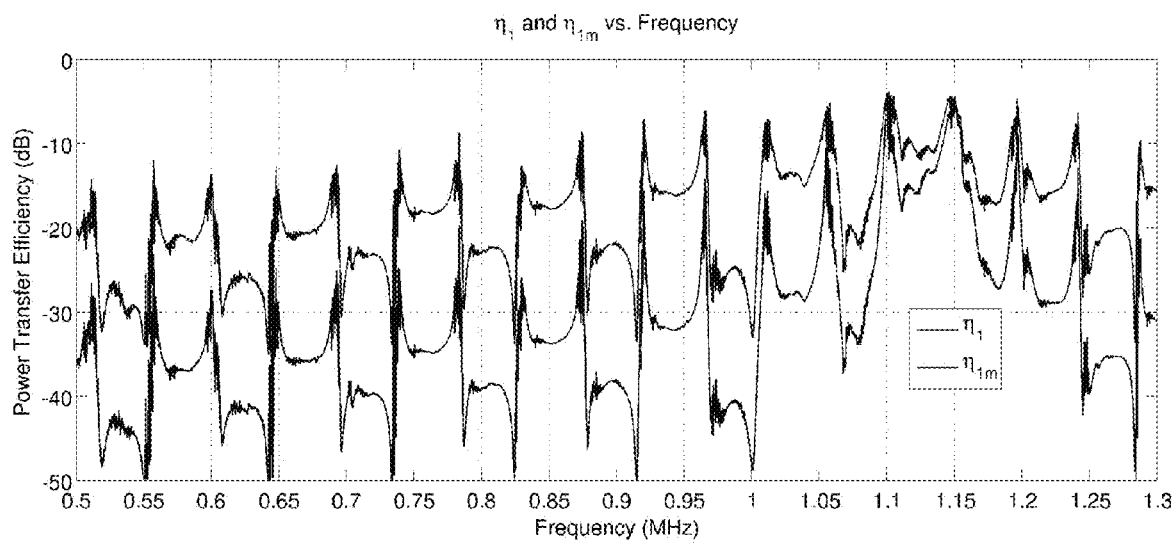
FIG. 15 is a graph of the power transfer efficiency of the 1 MHz power channel with the lower curve being unmatched and the upper curve being simultaneously conjugate matched signals.
Figure 16:
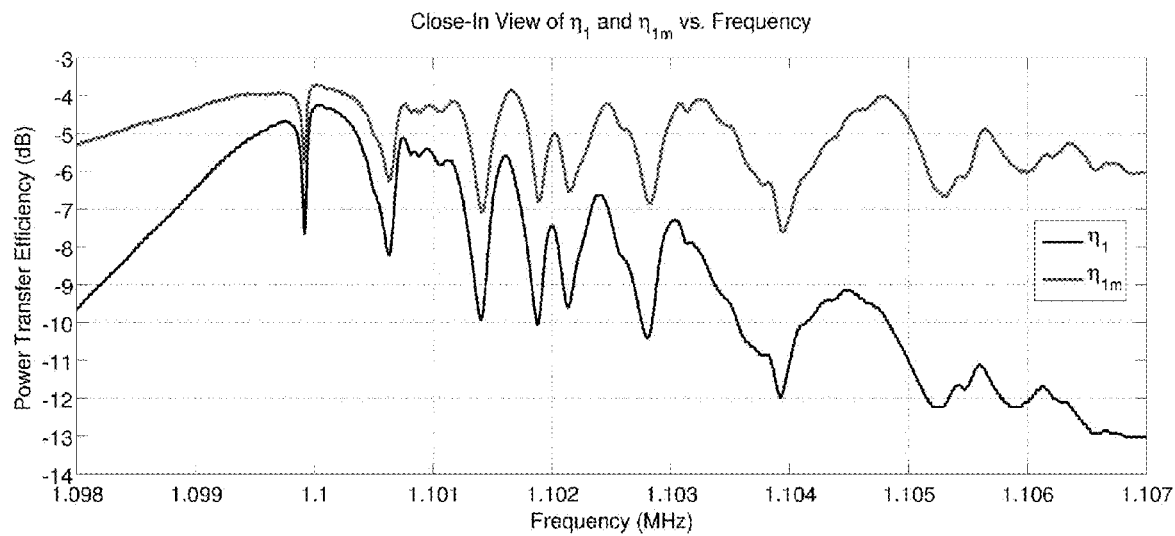
FIG. 16 is a close up view of the highest 1 MHz power channel efficiency peaks, the lower curve being unmatched and the upper curve being simultaneously conjugate matched signals.
Figure 17:
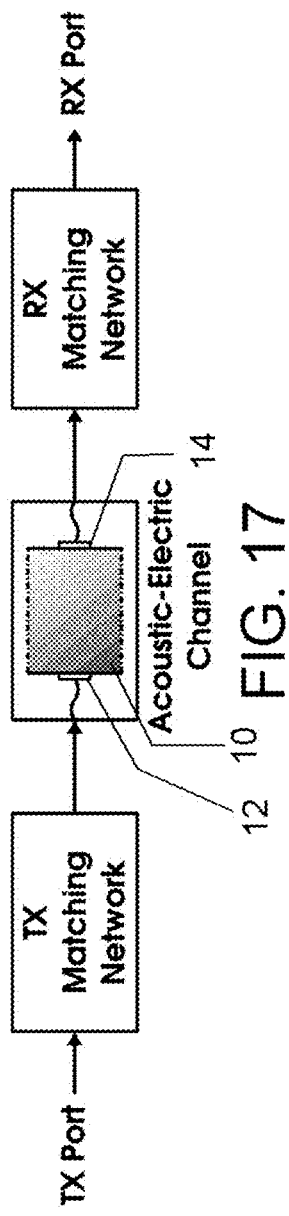
FIG. 17 is a block diagram of a power transmission channel with impedance matching networks on each port.

A network analyzer was used to measure the scattering parameters (S-parameters), as a function of frequency, of both the power and data transmission channels. Power transfer efficiency of the power channel in the frequency range of 0.5-1.3 MHz was obtained using the S-parameter measurements us shown in FIG. 15 where the lower curve shows the results for unmatched and the upper curve showing the results for simultaneously conjugate matched signals. The efficiency of the unmodified channel, as loaded by constant 50 Ohm port impedances of the network analyzer, was measured and assessed. These results were then used to calculate the electrically matched transfer function which represents the channel's efficiency if both of its electrical ports are simultaneously conjugate power matched at all frequencies. A close up view of the electrically unmatched and matched efficiency peaks shown in FIG. 16, demonstrates that an efficiency of 42.7% is possible near 1.1 MHz if low-loss electrical matching networks are implemented at each channel port as illustrated in FIG. 17.

Figure 18:
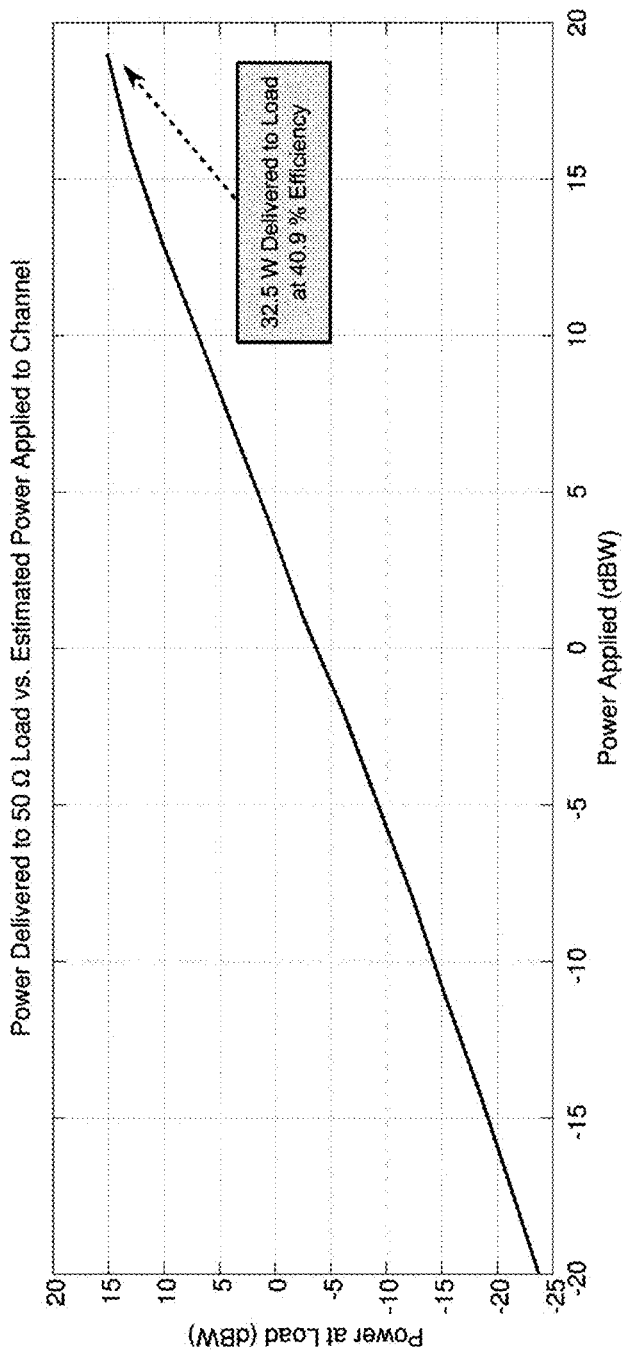
FIG. 18 shows the power sweep measurements for the power transmission channel.

Matching networks were designed to interface the power channel with standard radio-frequency (RF) electronics which have 50 Ohm port impedances. The hardware used for the AC power transmission link is shown in FIG. 8. A signal generator was used to create a continuous-wave (CW) power signal near 1.1 MHz, which was then sent through a 100 W power amplifier and applied to the channel through the TX matching network. When terminating the RX matching network with a 50 Ohm load, up to 32.5 W of AC power were successfully delivered through the 2.5 in. steel block with a high 40.9% efficiency, as highlighted by the applied power sweep data shown in FIG. 18. Given that the power sweep results in this analysis were very linear, higher power throughputs should be easily achieved through the use of a power amplifier with higher output power capabilities. Through more careful development of an additional power transmission channel, the system was later able to deliver approximately 50 W at an efficiency of 56% through a barrier of the same steel material and thickness using identical transducers. Ultimately, it will also be advantageous to produce a DC power supply for remote electronics using the AC power transmission link. A high-power and high-speed full-wave rectifier was implemented at an AC power link output that connected a matching network from the receiving transducer to a full-wave rectifier and load. As a test, the rectifier was loaded with 50 Ohms and a power sweep was performed on the system. At the maximum applied power level a 32 V, 20.5 W DC power supply was successfully created. This could easily be regulated to produce one or more additional high-power DC supplies.

Reverse Transmission Link

Figure 19:
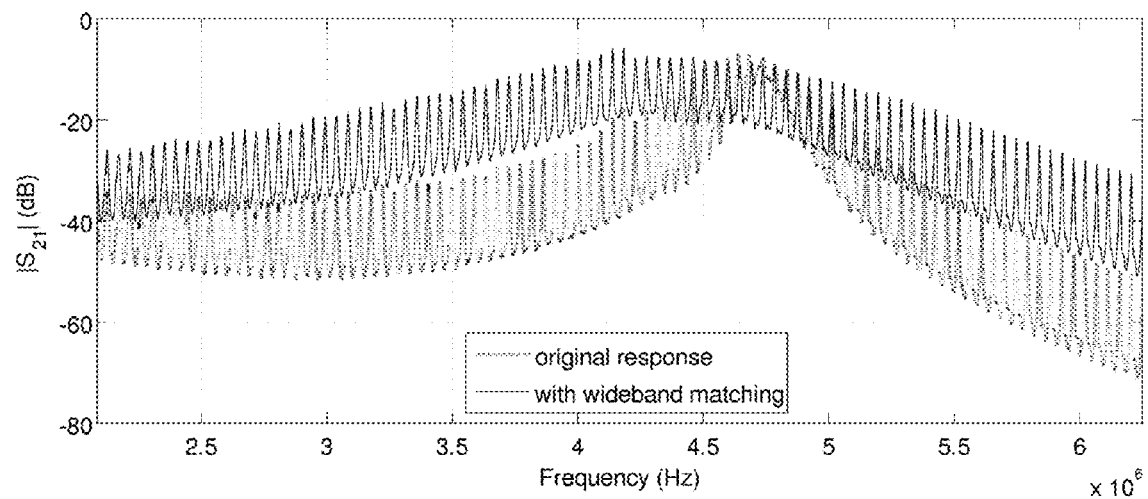
FIG. 19 is a graph showing the measured transfer function of a 4 MHz communication channel, the upper curve showing ordinary response and the lower curve showing response with wideband matching.

The frequency response of the 4 MHz data communication channel was characterized using a network analyzer. The transfer function of the channel, S21, between 2 MHz and 6.25 MHz was measured and a lot of amplitude variation was noticed across that bandwidth as shown in the bottom curve of FIG. 19. In order to reduce the extreme S21 variation in the channel, which can degrade performance and can require transmitter and receiver hardware with greater dynamic range, transformers were introduced at each electrical port as wideband impedance matching elements. The upper plot in FIG. 19 shows the measured transfer function of the communication system after adding the wideband matching transformer elements. An electrical matching network of incredible complexity would be required to match the channel's ports exactly across this wide of a bandwidth, so the transformer acts as a reasonable match to the average ideal conjugate matched port impedance seen across the entire frequency range. This semi-matched transfer function exhibits much less S21 variation.

Figure 20:
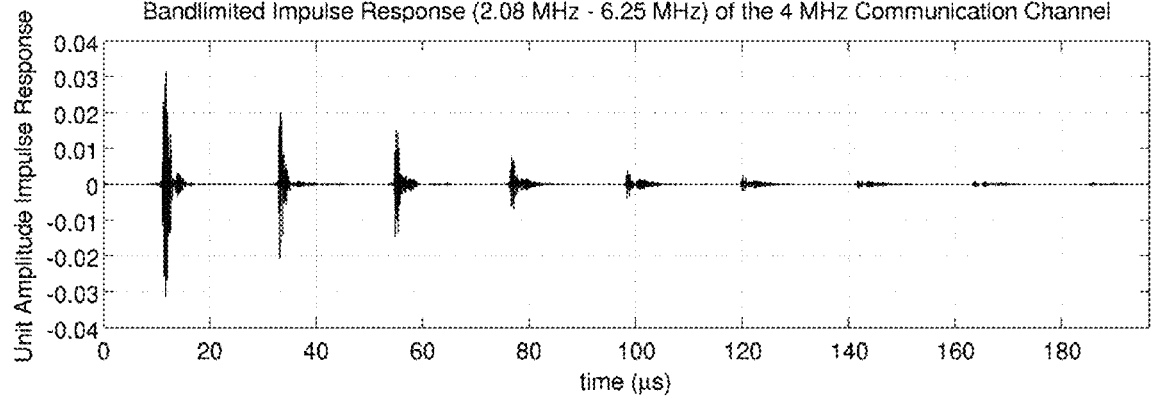
FIG. 20 is a graph plotting band-limited impulse response of the 4 MHz communication channel.

Using the frequency response of the semi-matched communication channel, the inventors were able to reconstruct the channel's band-limit impulse response which is shown in FIG. 20. Troublesome reverberation (echoes) were present in the acoustic-electric channels. Again, these echoes arise due to the abrupt changes in density and speed of sound at the interfaces between each mechanical layer (this is equivalent to a series of acoustic impedance mismatches). The time between the arrival of the first echo and the end of the last appreciable echo, which represents the channel's delay spread, is approximately 140 microseconds in this channel. This implies that the channel has a low coherence bandwidth of 7.1 kHz. With the traditional brute force communication approaches that existing competitor systems utilize, it would be difficult to achieve aggregate data rates above the 10-100 kbps range. With the prototype system of the present invention and the new communication approach of the invention, however, a 12.4 mega-bit per second (Mbps) data rate with high reliability is achieved. The capacity limit of the system is 48 Mbps and the system can be modified to approach this limit.

To accommodate the communication channel's narrow coherence bandwidth, the reverse data link was configured to use an orthogonal frequency-division multiplexing (OFDM) communication scheme, with 4096 sub-carriers between approximately 2.083 MHz and 6.25 MHz, giving a sub-carrier spacing of 1.01725 kHz. This spacing is well below the channel's coherence bandwidth of 7.1 kHz, allowing the system to easily mitigate the impact of multipath distortion from channel reverberations. In addition, the system was configured to use a cyclic prefix of approximately 250 microsecond to allow sufficient time for channel reverberations to decay without corrupting transmitted OFDM data. Each of the sub-carriers was modulated using phase-shift keying (PSK) at one of 4 modulation levels: binary PSK (1 bit per symbol), quaternary PSK (2 bits per symbol), 8-ary PSK (3 bits per symbol), or 16-ary PSK (4 bits per symbol). The modulation level used per sub-carrier was dependent on the strength of the channel's transfer function at that sub-carrier frequency. When the channel's response was strong at a given sub-carrier frequency, the signal to noise ratio (SNR) on that sub-carrier was high and it could support higher PSK modulation. When the channel's response was weak, the SNR was lower, and subsequently a lower PSK modulation level was selected. This dynamic allocation of information per subcarrier is called bit-loading, and it ensures that the system can achieve a high spectral efficiency, despite its high frequency-selectivity.

A functional block diagram of the core digital signal processing (DSP) and mixed-signal elements of the OFDM transmitter structure is identical to the system presented previously in FIG. 4. An incoming digital data stream is partitioned into 1-to-4 bit long sequences, which are each encoded as the phase of a particular sub-carrier, as represented by a set of complex numbers. A 4096-point inverse fast Fourier transform is performed on this set of complex numbers to generate a complex discrete time-domain OFDM signal at baseband (around DC, or 0 Hz). A cyclic prefix was added to the signal with a length of approximately 250 microseconds (¼ of the OFDM symbol time), yielding a 20% reduction in the transmitted data throughput. The OFDM signal is then passed through a quadrature modulator which shifts the complex OFDM signal up in frequency to the target transmission bandwidth around 4 MHz, where the signal becomes purely real (no imaginary components). A digital-to-analog converter (DAC) is then used to take the discrete time-domain signal and convert it to a continuous time-domain signal that can be interfaced with analog electronics. In this specific implementation, the DAC output was passed through a low-pass reconstruction filter to reject sampling aliases, and then passed through a custom transducer driver circuit which amplifies the OFDM signal and applies it to one of the communication channel's transducers.

Figure 13:
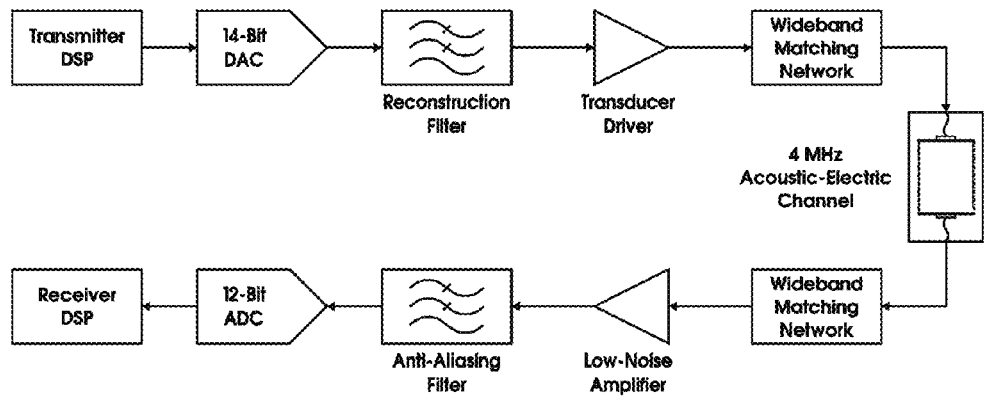
FIG. 13 is a block diagram of reverse data link signal path hardware of the invention.

Full reverse data link signal path hardware is illustrated in FIG. 13. The signal received from the opposite communication channel transducer is first passed through a transformer (wideband matching network) followed by a low-noise amplifier (LNA) to boost the OFDM signal level, as illustrated in FIG. 13. The LNA output is then passed through a low-pass anti-aliasing filter which eliminates any high-frequency noise or interference signals that could possibly alias and corrupt the OFDM signal as it is sampled by the subsequent analog-to-digital converter (ADC). At the ADC's output, discrete-time samples of the OFDM waveform are passed along to the receiver's DSP blocks. The core DSP elements of the OFDM receiver structure used in the prototype system are identical to those presented previously in FIG. 7. Here, a quadrature demodulator shifts the sampled OFDM signal down in frequency to baseband (around DC). The baseband OFDM signal is then put through a 4096-point complex fast Fourier transform to produce a set of complex numbers, each of which represents the magnitude and phase of each sub-carrier in the signal. These complex numbers are then sent through a stage that compensates for any phase shift that was introduced by the channel delay and reverberation. The compensated symbols are then sent sequentially through a symbol decoder which recovers the information encoded on each subcarrier, effectively reproducing the original serial digital bit-stream originally passed to the data link's transmitter hardware.

The DSP elements of the reverse data link's hardware were implemented in a Virtex-6 Field-Programmable Gate Array (FPGA) from Xilinx, on an ML605 evaluation board. Evaluation boards from Analog Devices were also used to prototype the quadrature modulator/demodulator and ADC and DAC hardware. The remaining analog hardware was assembled using some commercially available passive components, filters and amplifiers, as well as custom developed hardware.

After building and testing the reverse data link prototype with a target bit error rate of 10-6 (one error per million bits sent), it was found that out of the 4096 subcarriers, 3193 could sustain 16-ary PSK, 687 could sustain 8-ary PSK, 188 could sustain quaternary PSK, and 28 could sustain binary PSK, resulting in an aggregate bit-rate of 12.4 Mbps.

Simultaneous Data and Power Transmission

Given that the prototype system was configured to have a power transmission link at a frequency below the data transmission link's operating range, any non-ideal harmonics produced in the power transmission signal path could potentially leak into the data transmission link, thereby interfering with system performance. In addition, if enough power from the fundamental approximately 1.1 MHz power signal leaks into data channel, it could saturate the analog front-end electronics of the receiver hardware. This could effectively drown out the data signals and could prevent the data link from operating entirely. To address these concerns, and to enable simultaneous power and data transmission, some critical filtering was added to the system.

Figure 14:
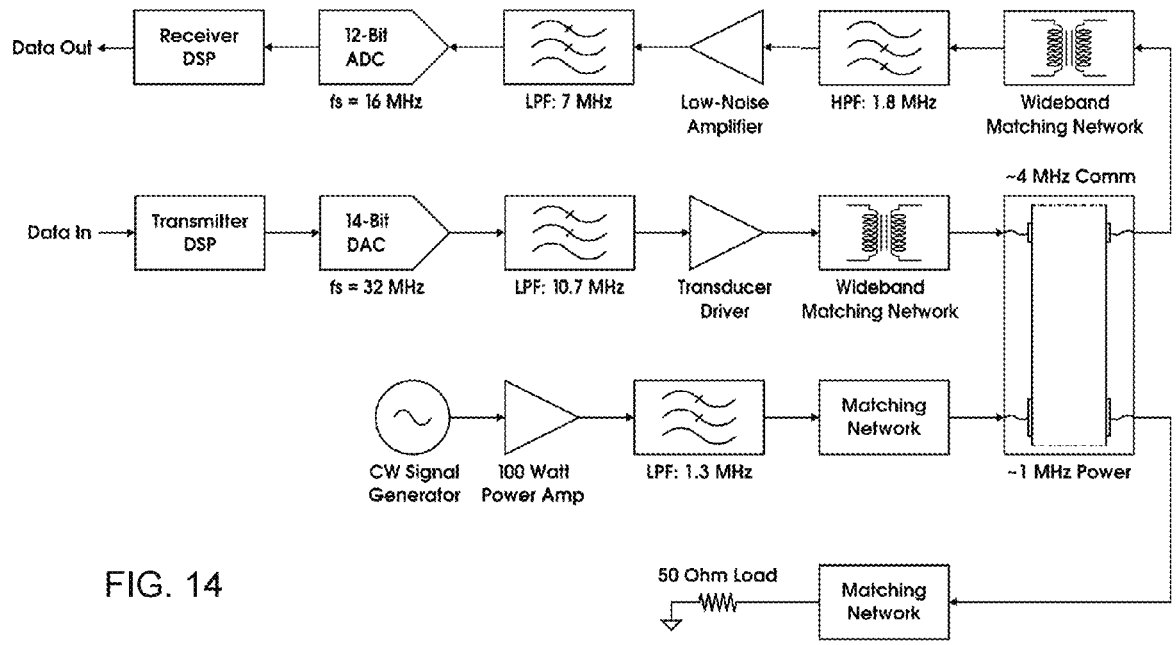
FIG. 14 is a block diagram that illustrates simultaneous power and data transmission system hardware of the invention.

To further reduce the size of any fundamental power leakage signals that show up in the communication signal path, a very sharp high-pass filter was added to the data link's receiver signal path, just before the LNA. A block diagram of the simultaneous power and data transmission hardware is presented in FIG. 14. The fundamental power leakage filter is shown in this diagram as the high-pass filter labeled 'HPF: 1.8 MHz', identifying its −3dB cutoff frequency at 1.8 MHz.

Second, to reduce the magnitude of any harmonics introduced in the power transmission link's signal path from component non-linearities, a sharp low-pass filter was introduced at the output of the power amplifier, just before the wideband matching network and TX power transducer. This filter can be seen in FIG. 14 as the low-pass filter labeled 'LPF: 1.3 MHz'.

Finally, it was recognized that if any power interference signals still coupled into the data transmission link, their energy could be considerably spread out amongst many nearby sub-carriers in the receiver if they do not fall precisely at one of the sub-carrier frequencies. To ensure that this energy-spreading did not occur, the CW signal generator for the power transmission link was synchronized with the clocks used to derive the sub-carrier frequencies in the data transmission hardware. With synchronicity between the power and data links, each power leakage signal was guaranteed to only corrupt a single sub-carrier in the data link.

With the careful transducer resonant frequency selection, the addition of the two previously described interference filters, and synchronizing the power and data transmission hardware, the prototype system was able to successfully mitigate interference between the power and data links using a very simple technique: disable the use of sub-carriers where interfering power products fall. The fundamental power signal as well as the 3rd and 5th harmonics all showed up as low-power interferers in the data link bandwidth. The 3 sub-carriers (out of the full 4096) associated with these interferers were disabled, preventing any interference between the power and data links with a negligibly small impact on the data link's throughput.

Measurements of this prototype system have revealed that it is capable of transmitting 50 W of power and approximately 12.4 Mbps simultaneously while ensuring no power-to-data link interference and maintaining highly-reliable data transmission at a bit-error rate of $10^{-6}$ (1 error per million transmitted bits). This yields a spectral efficiency of 2.98 bits per second per hertz (12.4 Mbps/4.167 MHz), which is significantly higher than all previously reported systems.

General Explanatory Comments

The invention does not use OFDM to transmit forward data on or with the power signal in FIG. 9. Instead, one uses conventional, single carrier modulations such amplitude-shift keying (ASK), phase-shift keying (PSK) or frequency-shift keying (FSK). The data rate for this link would be low because it is important to keep the bandwidth small for two reasons—the channel may have a small coherence bandwidth and one wants the harmonics of the power signal to be contained within only a small number of sub-carrier channels of the communications signals, preferably one channel for each harmonic frequency.

Part of the invention is sensing the performance of the power delivery channel and adjusting the frequency of the power delivery signal (a sinusoid if it is not being used to carry forward data, a modulated sinusoid if it is carrying data) to find a "good" frequency that transfers the signal efficiently from one side of the wall to the other.

Since changing the power delivery frequency will also change its harmonics, which may fall in the band of the communications signal, the clocks (e.g. clock 913) that are used to generate the OFDM data signals (reverse and, in the cases of FIGS. 10, 11 and 12, forward channels) are locked to the power delivery signal frequency. If the power delivery signal frequency changes, the sub-carrier frequencies and their spacing will change accordingly to maintain the desired frequency relationships that make the power delivery signal harmonic frequencies coincide with OFDM subcarrier frequencies.

The harmonics of the power signal are simply due to inherent non-linearity in the system, not due to data modulation. If the power signal is a sinusoid at a frequency fc, non-linearity may produce components at 2fc, 3fc, 4fc, etc. These are not related to any data modulation that may be on the power signal. The harmonic rejection filter 918 in FIG. 9 and in the embodiments of FIGS. 10-12, suppresses these harmonic frequencies, reducing their amplitude. In the test system of FIGS. 13 and 14, used to verify the effectiveness of the invention, the output of the power amplifier which was designed to be reasonably linear, had significant harmonic content and the filter reduced those harmonics to a more acceptable level.

An important aim of the invention is to make all the harmonics of the power delivery signal frequency (possibly including the power delivery frequency itself) that occur within the bandwidth of the communication signal, be exactly equal sub-carrier frequencies. These sub-carrier frequencies will then not be used by the communications signal, thereby avoiding potential interference from the power signal. The reduction in data rate caused by not using these few sub-carriers is very small.

If the harmonics do not occur at sub-carrier frequencies, the interference that they cause will be spread over many sub-carriers and will be difficult to remove without excluding many sub-carriers, greatly reducing the data rate.

To make multiple harmonic frequencies of the power signal each coincide with (i.e. land on) sub-carrier frequencies as noted above, the power delivery frequency ($f_{power}$) must be an integer multiple of the spacing between the sub-carrier frequencies, i.e., equation (1) above. Additionally, any one of the many sub-carrier frequencies must equal an integer multiple of the power delivery frequency, i.e., equation (2) above.

As long as one sub-carrier frequency satisfies this relationship and the sub-carrier spacing satisfies equation (1), the power signal interference can be removed by simply not using the small number of affected sub-carriers.

The power receiver in each embodiment of the invention includes the clock shown for example at 913 in FIG. 9, for recovering the continuous-wave power delivery signal and is used it as a reference clock to which the orthogonal frequency-division multiplexing modulator 928 is synchronized, the clock having multiplier and divider stages through which the power delivery signal is passed to generate a clock at the sub-carrier spacing frequency, rates of a remainder of the orthogonal frequency-division multiplexing modulator being derived directly from the sub-carrier spacing frequency using additional clock multipliers.

While specific embodiments of the invention have been shown and described in detail to illustrate the application of the principles of the invention, it will be understood that the invention may be embodied otherwise without departing from such principles.

What is claimed is:

1. An apparatus for transmitting data and power through a barrier using ultrasonic waves, the barrier having a delay spread that is a function of acoustic properties of the barrier, an inverse of the delay spread being a coherence bandwidth of the barrier, the apparatus comprising:

at least two ultrasonic channels through the barrier, each channel comprising at least one ultrasonic transducer acoustically coupled to the barrier on each of a transmission side of the barrier and a receiving side of the barrier;

a power transmitter for sending a power signal at a power delivery frequency ($f_{power}$) over one of the channels via one of the ultrasonic transducers on the transmission side of the barrier, there being a plurality of power harmonic frequencies that are each at an integer multiple of the power delivery frequency;

a forward data transmitter for sending a forward transmitted data signal over one of the channels via one of the ultrasonic transducers on the transmission side of the barrier;

a forward data receiver for receiving the forward transmission data signal over the one channel and at one of the ultrasonic transducers on the receiving side of the barrier, the data receiver including a demodulator for recreating the forward transmitted data signal on the receiving side of the barrier;

a power receiver for receiving the power signal over the one channel and at one of the ultrasonic transducers on the receiving side of the barrier, the power receiver including a power converter for harvesting power at the receiving side of the barrier;

a reverse data transmitter having an orthogonal frequency-division multiplexing modulator for receiving the demodulated forward transmitted data signal and a reverse transmitted data signal, the orthogonal frequency-division multiplexing modulator creating and sending a reverse data signal over one of the channels and via one of the ultrasonic transducers on the receiving side of the barrier;

the orthogonal frequency-division multiplexing modulator sending the reverse data signal as a signal that is made up of a multiplicity of sub-carriers at a multiplicity of different sub-carrier frequencies ($f_{subcarrier}$) that are each spaced from each other by a subcarrier frequency spacing ($f_{subcarrier\ spacing}$), each sub-carrier having a bandwidth that is smaller than the coherence bandwidth of the channel;

the power delivery frequency ($f_{power}$) being selected to be an integer multiple (N) of the frequency spacing ($f_{subcarrier\ spacing}$) and at least some of the sub-carrier frequencies ($f_{subcarrier}$) being selected to be an integer multiple (M) of the power delivery frequency ($f_{power}$), the orthogonal frequency-division multiplexing modulator using none of the at least some sub-carrier frequencies that are integer multiples of the power delivery frequency; and a reverse data receiver for receiving the reverse data signal, the reverse data receiver including a demultiplexer and a demodulator for recreating the reverse data signal on the transmission side of the barrier.

2. The apparatus of claim 1, wherein the power signal is a continuous-wave power delivery signal, the power receiver including a clock recovery and distribution system for recovering the continuous-wave power delivery signal and using it as a reference clock to which the orthogonal frequency-division multiplexing modulator is synchronized, the clock recovery and distribution system having multiplier and divider stages through which the power delivery signal is passed to generate a clock at the sub-carrier spacing frequency, rates of a remainder of the orthogonal frequency-division multiplexing modulator being derived directly from the sub-carrier spacing frequency using additional clock multipliers and dividers.

3. The apparatus of claim 1, wherein the reverse data receiver creates side information in response to at least one acoustic property of the barrier, the forward transmitter sending the side information to the forward receiver, the reverse data transmitter being connected to the forward data receiver for receiving the side information for adjusting the orthogonal frequency-division multiplexing modulator in response to the side information.

4. The apparatus of claim 1, wherein the reverse data transmitter adds a cyclic prefix before the reverse transmitted data signal that has a length substantially greater than or equal to the delay spread.

5. The apparatus of claim 1, wherein the reverse data transmitter adds a cyclic prefix before the reverse transmitted data signal that has a length substantially greater than or equal to the delay spread, and the reverse data receiver removes the cyclic prefix from the reverse data signal.

6. The apparatus of claim 1, wherein the power converter creates side information in response to at least one acoustic property of the barrier, the reverse data transmitter receiving the side information and sending the side information to the reverse data receiver being connected to the power transmitter for adjusting the power delivery frequency in response to the at least one acoustic property of the barrier.

7. The apparatus of claim 1, wherein: the at least two ultrasonic channels comprise first, second and third ultrasonic channels through the barrier, each channel comprising at least one ultrasonic transducer acoustically coupled to the barrier on each of the opposite sides of the barrier; the reverse data transmitter creating and sending the reverse data signal over the second channel and via one of the ultrasonic transducers on the receiving side of the barrier, the reverse data signal including side information representing at least one acoustic property of the barrier; the reverse data receiver being connected to the forward data transmitter for adjusting the orthogonal frequency-division multiplexing modulator in response to the side information and the at least one acoustic property of the barrier represented by the side information; the power transmitter being connected to its associated ultrasonic transducer on the transmission side of the first channel; and the forward data transmitter being connected to its associated ultrasonic transducer on the transmission side of the third channel.

8. The apparatus of claim 1, wherein the at least two ultrasonic channels comprise a first and a second ultrasonic channel through the barrier, each channel comprising at least one ultrasonic transducer acoustically coupled to the barrier on each of the opposite sides of the barrier; the reverse data transmitter creating and sending the reverse data signal over the second channel and via one of the ultrasonic transducers on the receiving side of the barrier, the reverse data signal including side information representing at least one acoustic property of the barrier; the reverse data receiver receiving the reverse data signal at the at least one ultrasonic transducer of the second channel on the transmission side of the barrier, the reverse data receiver being connected to the forward data transmitter for adjusting the orthogonal frequency-division multiplexing modulator in response to the side information and the at least one acoustic property of the barrier represented by the side information; the power transmitter being connected to its associated ultrasonic transducer on the transmission side of the first channels; the forward data transmitter and the forward data receiver being connected to the ultrasonic transducers of the second channel; and time-sharing circulators connecting the forward data transmitter and the reverse data receiver to the transducer on the transmission side of the second channel, and connecting the reverse data transmitter and the forward data receiver on the receiving side of the second channel.

9. The apparatus of claim 1, wherein the at least two ultrasonic channels comprise a first and a second ultrasonic channel through the barrier, each channel comprising at least one ultrasonic transducer acoustically coupled to the barrier on each of the opposite sides of the barrier; the reverse data transmitter creating and sending the reverse data signal over the second channel and via one of the ultrasonic transducers on the receiving side of the barrier, the reverse data signal including side information representing at least one acoustic property of the barrier; the reverse data receiver receiving the reverse data signal at the at least one ultrasonic transducer of the second channel on the transmission side of the barrier, the reverse data receiver being connected to the forward data transmitter for adjusting the orthogonal frequency-division multiplexing modulator in response to the side information and the at least one acoustic property of the barrier represented by the side information; the power transmitter being connected to its associated ultrasonic transducer on the transmission side of the first channels; the forward data transmitter and the forward data receiver being connected to the ultrasonic transducers of the second channel; and the sub-carriers of the forward transmission signal being at different frequencies from the sub-carriers of the reverse data signal.

10. An apparatus for transmitting data and power through a barrier using ultrasonic waves, the barrier having a delay spread that is a function of acoustic properties of the barrier, an inverse of the delay spread being a coherence bandwidth of the barrier, the apparatus comprising:
at least two ultrasonic channels through the barrier, each channel comprising at least one ultrasonic transducer acoustically coupled to the barrier on each of a transmission side of the barrier and a receiving side of the barrier;
a power transmitter for sending a power signal at a power delivery frequency ($f_{power}$) over one of the channels via one of the ultrasonic transducers on the transmission side of the barrier, there being a plurality of power harmonic frequencies that are each at an integer multiple of the power delivery frequency;
a forward data transmitter for sending a forward transmitted data signal over one of the channels via one of the ultrasonic transducers on the transmission side of the barrier;
a forward data receiver for receiving the forward transmission data signal over the one channel and at one of the ultrasonic transducers on the receiving side of the barrier, the data receiver including a demodulator for recreating the forward transmitted data signal on the receiving side of the barrier;
a power receiver for receiving the power signal over the one channel and at one of the ultrasonic transducers on the receiving side of the barrier, the power receiver including a power converter for harvesting power at the receiving side of the barrier;
a reverse data transmitter having an orthogonal frequency-division multiplexing modulator for receiving the demodulated forward transmitted data signal and a reverse transmitted data signal, the orthogonal frequency-division multiplexing modulator creating and sending a reverse data signal over one of the channels and via one of the ultrasonic transducers on the receiving side of the barrier;
the orthogonal frequency-division multiplexing modulator sending the reverse data signal as a signal that is made up of a multiplicity of sub-carriers at a multiplicity of different sub-carrier frequencies ($f_{subcarrier}$) that are each spaced from each other by a subcarrier frequency spacing ($f_{subcarrier\ spacing}$), each sub-carrier having a bandwidth that is smaller than the coherence bandwidth of the channel;
the power delivery frequency ($f_{power}$) being selected to be an integer multiple (N) of the frequency spacing ($f_{subcarrier\ spacing}$) and at least some of the sub-carrier frequencies ($f_{subcarrier}$) being selected to be an integer multiple (M) of the power delivery frequency ($f_{power}$);
the orthogonal frequency-division multiplexing modulator using none of the at least some sub-carrier frequencies that are integer multiples of the power delivery frequency; and
a reverse data receiver for receiving the reverse data signal, the reverse data receiver including a demultiplexer and a demodulator for recreating the reverse data signal on the transmission side of the barrier;
the power signal being a continuous-wave power delivery signal, the power receiver including a recovery and distribution system for recovering the continuous-wave power delivery signal and using it as a reference clock to which the orthogonal frequency-division multiplexing modulator is synchronized, the clock recovery and distribution system having multiplier and divider stages through which the power delivery signal is passed to generate a clock at the sub-carrier spacing frequency, rates of a remainder of the orthogonal frequency-division multiplexing modulator being derived directly from the sub-carrier spacing frequency using additional clock multipliers and dividers.

11. The apparatus of claim 10, wherein the reverse data transmitter adds a cyclic prefix before the reverse transmitted data signal that has a length greater than or equal to the delay spread.

12. The apparatus of claim 10, wherein the forward data transmitter and power transmitter share the same channel.

13. The apparatus of claim 10, including time-share circulators connected to the forward data transmitter and to the reverse data transmitter so that the forward data transmitter and the reverse data transmitter share the same channel.

14. The apparatus of claim 10, including the forward data transmitter and the reverse data transmitter operating at different frequencies and being connected to the same channel.

15. The apparatus of claim 10, wherein the forward data transmitter, the power transmitter and the reverse data transmitter are connected to three different channels.

16. The apparatus of claim 10, wherein the power converter creates side information in response to at least one acoustic property of the barrier, the reverse data transmitter receiving the side information and sending the side information to the reverse data receiver being connected to the power transmitter for adjusting the power delivery frequency in response to the at least one acoustic property of the barrier.

17. A method of transmitting data and power through a barrier using ultrasonic waves, the barrier having a delay spread that is a function of acoustic properties of the barrier, an inverse of the delay spread being a coherence bandwidth of the barrier, the method comprising:
provinding at least two ultrasonic channels through the barrier, each channel comprising at least one ultrasonic transducer acoustically coupled to the barrier on each of two opposite sides of the barrier;
using a power transmitter for sending a power signal at a power delivery frequency ($f_{power}$) over one of the channels via one of the ultrasonic transducers on the transmission side of the barrier, there being a plurality of power harmonic frequencies that are each at an integer multiple of the power delivery frequency;
using a forward data transmitter for sending a forward transmitted data signal over one of the channels via one of the ultrasonic transducers on the transmission side of the barrier;
using a forward data receiver for receiving the forward transmission data signal over the one channel and at one of the ultrasonic transducers on the receiving side of the barrier, the data receiver including a demodulator for recreating the forward transmitted data signal on the receiving side of the barrier;
using a power receiver for receiving the power signal over the one channel and at one of the ultrasonic transducers on the receiving side of the barrier, the power receiver including a power converter for harvesting power at the receiving side of the barrier;
using a reverse data transmitter having an orthogonal frequency-division multiplexing modulator for receiving the demodulated forward transmitted data signal and a reverse transmitted data signal, the orthogonal frequency-division multiplexing modulator creating and sending a reverse data signal over one of the channels and via one of the ultrasonic transducers on the receiving side of the barrier;
the orthogonal frequency-division multiplexing modulator sending the reverse data signal as a signal that is made up of a multiplicity of sub-carriers at a multiplicity of different sub-carrier frequencies ($f_{subcarrier}$) that are each spaced from each other by a subcarrier frequency spacing ($f_{subcarrier\ spacing}$), each sub-carrier having a bandwidth that is smaller than the coherence bandwidth of the channel;
selecting the power delivery frequency $f_{power}$) to be an integer multiple (N) of the frequently spacing ($f_{subcarrier\ spacing}$) and at least some of the sub-carrier frequencies ($f_{subcarrier}$) being selected to be an integer multiple (M) of the power delivery frequency ($f_{power}$);
using none of the at least some sub-carrier frequencies that are integer multiples of the power delivery frequency in the orthogonal frequency-division multiplexing modulator; and
using a reverse data receiver for receiving the reverse data signal, the reverse data receiver including a demultiplexer and a demodulator for recreating the reverse data signal on the transmission side of the barrier.

18. The method of claim 17, including adding a cyclic prefix before the reverse transmitted data signal that has a length substantially greater than or equal to the delay spread.

19. The method of claim 17, wherein the forward data transmitter and power transmitter share the same channel.

20. The method of claim 17, including connecting the forward data transmitter and the reverse data transmitter to same channel and separating forward and reverse signals by one of time-sharing and frequency band differentiation of sub-carriers.

21. The method of claim 17, wherein the power signal is a continuous-wave power delivery signal, the power receiver including a clock recovery and distribution system for recovering the continuous-wave power delivery signal and using it as a reference clock to which the orthogonal frequency-division multiplexing modulator is synchronized, the clock recovery and distribution system having multiplier and divider stages through which the power delivery signal is passed to generate a clock at the sub-carrier spacing frequency, rates of a remainder of the orthogonal frequency-division multiplexing modulator being derived directly from the sub-carrier spacing frequency using additional clock multipliers and dividers.

22. The method of claim 17, including the reverse data receiver creating side information in response at least one acoustic property of the barrier, the forward transmitter sending the side information to the forward receiver, the reverse data transmitter being connected to the forward data receiver for receiving the side information for adjusting the orthogonal frequency-division multiplexing modulator in response to the side information.

23. The method of claim 17, including the power converter creating side information in response to at least one acoustic property of the barrier, the reverse data transmitter receiving the side information and sending the side information to the reverse data receiver being connected to the power transmitter and adjusting the power delivery frequency in response to the at least one acoustic property of the barrier.

* * * * *